US012436167B2

(12) United States Patent
Tanaka

(10) Patent No.: US 12,436,167 B2
(45) Date of Patent: *Oct. 7, 2025

(54) PHYSICAL QUANTITY SENSOR AND INERTIAL MEASUREMENT DEVICE

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,691

(22) Filed: Oct. 28, 2022

(65) Prior Publication Data
US 2023/0136163 A1 May 4, 2023

(30) Foreign Application Priority Data
Oct. 29, 2021 (JP) ................. 2021-177278

(51) Int. Cl.
*G01P 15/125* (2006.01)
*G01P 15/00* (2006.01)
(Continued)

(52) U.S. Cl.
CPC .......... *G01P 15/125* (2013.01); *G01P 15/135* (2013.01); *G01P 15/18* (2013.01);
(Continued)

(58) Field of Classification Search
CPC .............................................. G01P 2015/0828
See application file for complete search history.

(56) References Cited

U.S. PATENT DOCUMENTS

2003/0210511 A1  11/2003  Sakai et al.
2006/0185433 A1*  8/2006  Leonardson .......... G01P 15/125
                                                                73/514.32
(Continued)

FOREIGN PATENT DOCUMENTS

DE    102020119371 B3 *  8/2021  ............ G01P 15/125
JP    2003-337138 A    11/2003
(Continued)

*Primary Examiner* — Douglas X Rodriguez
*Assistant Examiner* — Ruben C Parco, Jr.
(74) *Attorney, Agent, or Firm* — Harness, Dickey & Pierce, P.L.C.

(57) ABSTRACT

A physical quantity sensor includes first and second fixed electrode sections on a substrate, a first movable electrode section having a movable electrode opposite a fixed electrode of the first fixed electrode section, a second movable electrode section having a movable electrode opposite a fixed electrode of the second fixed electrode section, first and second fixed sections fixed to the substrate, a first support beam having one end coupled to the first fixed section, a first coupling section coupling the other end of the first support beam and the first movable electrode section, a second support beam having one end coupled to the second fixed section, and a second coupling section coupling the other end of the second support beam and the second movable electrode section. The first movable electrode section, the second fixed section, the first fixed section, and the second movable electrode section are disposed side by side.

12 Claims, 10 Drawing Sheets

(51) Int. Cl.
*G01P 15/135* (2006.01)
*G01P 15/18* (2013.01)
*G01P 15/08* (2006.01)

(52) U.S. Cl.
CPC .............. *G01P 2015/0828* (2013.01); *G01P 2015/0831* (2013.01)

(56) References Cited

U.S. PATENT DOCUMENTS

| | | | | |
|---|---|---|---|---|
| 2007/0119252 A1* | 5/2007 | Adams | ............... | G01P 15/125 |
| | | | | 73/514.32 |
| 2008/0314147 A1* | 12/2008 | Nasiri | ............... | G01P 15/125 |
| | | | | 73/514.32 |
| 2010/0024552 A1* | 2/2010 | Foster | ............... | G01P 15/131 |
| | | | | 73/514.32 |
| 2015/0000403 A1* | 1/2015 | Liukku | ............... | G01P 15/18 |
| | | | | 73/510 |
| 2016/0332864 A1 | 11/2016 | Iihola et al. | | |
| 2017/0074658 A1 | 3/2017 | Tanaka | | |
| 2017/0363656 A1 | 12/2017 | Fang et al. | | |
| 2018/0031603 A1* | 2/2018 | Huang | ............... | G01P 15/097 |
| 2019/0162538 A1* | 5/2019 | Thompson | ........... | B81B 3/0078 |
| 2020/0158751 A1 | 5/2020 | Malvern | | |
| 2021/0063432 A1 | 3/2021 | Fujimoto et al. | | |
| 2022/0282973 A1 | 9/2022 | Milani et al. | | |

FOREIGN PATENT DOCUMENTS

| | | |
|---|---|---|
| JP | 2018-515353 A | 6/2018 |
| JP | 2021-032820 A | 3/2021 |

* cited by examiner

PHYSICAL QUANTITY SENSOR AND INERTIAL MEASUREMENT DEVICE

The present application is based on, and claims priority from JP Application Serial Number 2021-177278, filed Oct. 29, 2021, the disclosure of which is hereby incorporated by reference herein in its entirety.

BACKGROUND

1. Technical Field

The present disclosure relates to a physical quantity sensor and an inertial measurement device.

2. Related Art

There has been known a physical quantity sensor that detects a physical quantity such as acceleration. As such a physical quantity sensor, there is, for example, a sensor disclosed in JP-A-2021-32820 (Patent Literature 1). Patent Literature 1 discloses a physical quantity sensor in which a plurality of sensor elements that respectively include fixed electrodes and movable electrodes and detect physical quantities are disposed.

In the physical quantity sensor disclosed in Patent Literature 1, the plurality of sensor elements are disposed in parallel in a Y-axis direction. Accordingly, a dead space is easily formed and it is difficult to reduce the size of the physical quantity sensor. Since fixed sections of the sensor elements are disposed to be separated, the sensor elements are easily affected by a warp of a substrate. It is difficult to perform accurate detection.

SUMMARY

An aspect of the present disclosure relates to a physical quantity sensor including: a first fixed electrode section and a second fixed electrode section provided on a substrate; a first movable electrode section provided such that a movable electrode is opposed to a fixed electrode of the first fixed electrode section; a second movable electrode section provided such that a movable electrode is opposed to a fixed electrode of the second fixed electrode section; a first fixed section and a second fixed section fixed to the substrate; a first support beam, one end of which is coupled to the first fixed section; a first coupling section configured to couple another end of the first support beam and the first movable electrode section; a second support beam, one end of which is coupled to the second fixed section; and a second coupling section configured to couple another end of the second support beam and the second movable electrode section. When three directions orthogonal to one another are represented as a first direction, a second direction, and a third direction, in a plane view in the third direction orthogonal to the substrate, the first movable electrode section, the second fixed section, the first fixed section, and the second movable electrode section are disposed side by side in the first direction in order of the first movable electrode section, the second fixed section, the first fixed section, and the second movable electrode section.

Another aspect of the present disclosure relates to an inertial measurement device including: the physical quantity sensor described above; and a control section configured to perform control based on a detection signal output from the physical quantity sensor.

DESCRIPTION OF EXEMPLARY EMBODIMENTS

An embodiment is explained below. The embodiment explained below does not unduly limit description content of claims. Not all of components explained in this embodiment are essential constituent elements.

1. Physical Quantity Sensor

Figure 1:
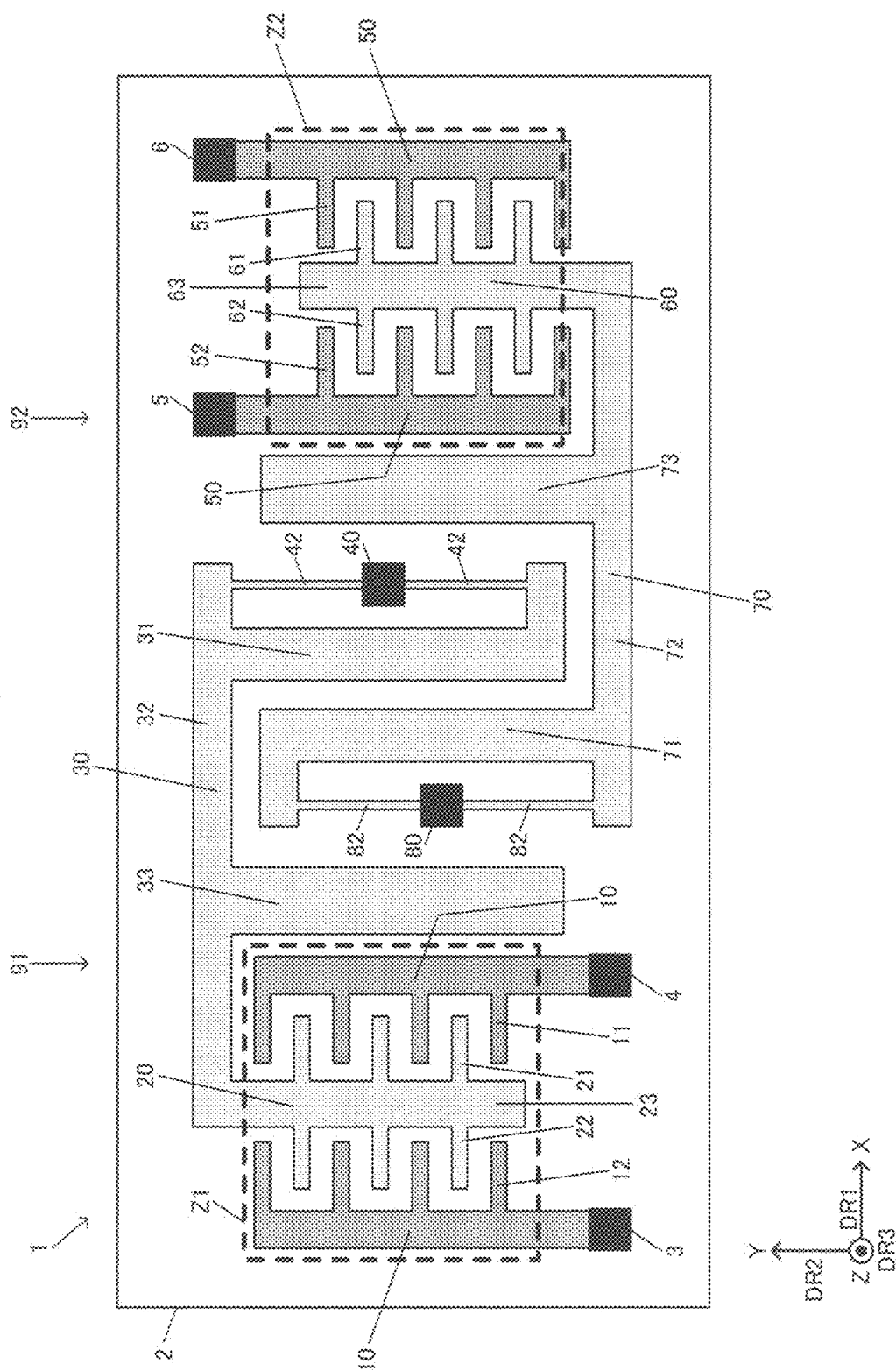
FIG. 1 is a plan view showing a configuration example of a physical quantity sensor in an embodiment.

A configuration example of a physical quantity sensor 1 in this embodiment is explained with reference to FIG. 1 citing, as an example, an acceleration sensor that detects acceleration in the vertical direction. FIG. 1 is a plan view in a plane view in a direction orthogonal to a substrate 2 of the physical quantity sensor 1. The physical quantity sensor 1 is an MEMS (Micro Electro Mechanical System) device and is, for example, an inertial sensor.

In FIG. 1 and FIGS. 6 to 9 and the like referred to below, for convenience of explanation, dimensions of members, intervals among the members, and the like are schematically shown. Not all of components are shown. For example, illustration is omitted about electrode wires, electrode terminals, and the like. In the following explanation, an example is mainly explained in which a physical quantity detected by the physical quantity sensor 1 is acceleration. However, the physical quantity is not limited to the acceleration and may be other physical quantity such as speed, pressure, displacement, angular velocity, or gravity. The physical sensor 1 may be used as a pressure sensor, an MEMS switch, or the like. Directions orthogonal to one another in FIG. 1 are represented as a first direction DR1, a second direction DR2, and a third direction DR3. The first direction DR1, the second direction DR2, and the third direction DR3 are respectively, for example, an X-axis direction, a Y-axis direction, and a Z-axis direction but are not limited to this. For example, the third direction DR3 corresponding to the Z-axis direction is, for example, a direction orthogonal to the substrate 2 of the physical quantity sensor 1 and is, for example, the vertical direction. The first direction DR1 corresponding to the X-axis direction and the second direction DR2 corresponding to the Y-axis direction are directions orthogonal to the third direction DR3. An XY plane, which is a surface in the first direction DR1 and the second direction DR2, is along, for example, a horizontal plane. "Orthogonal" includes crossing at an angle slightly tilting from 90° besides crossing at 90°.

The substrate 2 is, for example, a silicon substrate made of semiconductor silicon or a glass substrate made of a glass material such as borosilicate glass. However, a constituent material of the substrate 2 is not particularly limited. A quartz substrate, an SOI (Silicon On Insulator) substrate, or the like may be used.

As shown in FIG. 1, the physical quantity sensor 1 in this embodiment includes a first fixed electrode section 10, a first movable electrode section 20, a first coupling section 30, a first fixed section 40, and first support beams 42. A first element section 91 of the physical quantity sensor 1 is configured by the first fixed electrode section 10, the first movable electrode section 20, the first coupling section 30, the first fixed section 40, and the first support beams 42. The first element section 91 detects, for example, acceleration in the third direction DR3, which is the Z-axis direction, in a detecting section Z1.

The physical quantity sensor 1 includes a second fixed electrode section 50, a second movable electrode section 60, a second coupling section 70, a second fixed section 80, and second support beams 82. A second element section 92 of the physical quantity sensor 1 is configured by the second fixed electrode section 50, the second movable electrode section 60, the second coupling section 70, the second fixed section 80, and the second support beams 82. The second element section 92 detects, for example, acceleration in the third direction DR3, which is the Z-axis direction, in a detecting section Z2.

The first fixed electrode section 10 and the second fixed electrode section 50 are provided on the substrate 2. Specifically, the first fixed electrode section 10 is fixed to the substrate 2 by fixed sections 3 and 4. The second fixed electrode section 50 is fixed to the substrate 2 by fixed sections 5 and 6. The first fixed electrode section 10 and the second fixed electrode section 50 include pluralities of fixed electrodes. The pluralities of fixed electrodes extend, for example, in the first direction DR1, which is the X-axis direction. For example, the first fixed electrode section 10 is a first fixed electrode group and the second fixed electrode section 50 is a second fixed electrode group.

The first movable electrode section 20 is provided such that movable electrodes are opposed to the fixed electrodes of the first fixed electrode section 10. The second movable electrode section 60 is provided such that movable electrodes are opposed to the fixed electrodes of the second fixed electrode section 50. The first movable electrode section 20 and the second movable electrode section 60 include pluralities of movable electrodes. The plurality of movable electrodes extend, for example, in the first direction DR1, which is the X-axis direction. For example, the first movable electrode section 20 is a first movable electrode group and the second movable electrode section 60 is a second movable electrode group. Specifically, first movable electrodes 21 and second movable electrodes 22 of the first movable electrode section 20 are opposed to first fixed electrodes 11 and second fixed electrodes 12 of the first fixed electrode section 10 in the second direction DR2, which is the Y-axis direction. Third movable electrodes 61 and fourth movable electrodes 62 of the second movable electrode section 60 are opposed to third fixed electrodes 51 and fourth fixed electrodes 52 of the second fixed electrode section 50 in the second direction DR2, which is the Y-axis direction.

For example, in FIG. 1, the first movable electrode section 20 and the second movable electrode section 60 are interdigital movable electrode groups in which pluralities of movable electrodes are disposed in a interdigital shape in a plane view in the third direction DR3. The first fixed electrode section 10 and the second fixed electrode section 50 are interdigital fixed electrode groups in which pluralities of fixed electrodes are disposed in a interdigital shape in the plane view in the third direction DR3. In the detecting section Z1 of the first element section 91, the movable electrodes of the interdigital movable electrode group of the first movable electrode section 20 and the fixed electrodes of the interdigital fixed electrode group of the first fixed electrode section 10 are disposed to be alternately opposed to each other. In the detecting section Z2 of the second element section 92, the movable electrodes of the interdigital movable electrode group of the second movable electrode section 60 and the fixed electrodes of the interdigital fixed electrode group of the second fixed electrode section 50 are disposed to be alternately opposed to each other.

The first fixed section 40 and the second fixed section 80 are fixed to the substrate 2. One ends of the first support beams 42 are coupled to the first fixed section 40. One ends of the second support beams 82 are coupled to the second fixed section 80. For example, the first support beams 42 are first torsion springs and the second support beams 82 are second torsion springs. In FIG. 1, as the first support beams 42, two support beams extending in the second direction DR2, that is, the first support beam 42 extending from the first fixed section 40 to the second direction DR2 side and the first support beam 42 extending from the first fixed section 40 to the opposite direction side of the second direction DR2 are provided. As the second support beams 82, two support beams extending in the second direction DR2, that is, the second support beam 82 extending from the second fixed section 80 to the second direction DR2 side and the second support beam 82 extending from the second fixed section 80 to the opposite direction side of the second direction DR2 are provided.

The first fixed section 40 is used as an anchor of a first movable body configured by the first movable electrode section 20 and the first coupling section 30. The first movable body including the first movable electrode section 20 seesaws around a rotation axis extending in the second direction DR2 with the first fixed section 40 as a fulcrum. For example, the first movable body swings, with the first support beam 42 extending in the second direction DR2 as a rotation axis, around the rotation axis while torsionally deforming the first support beam 42. Consequently, the first element section 91 having a one-side seesaw structure is realized.

The second fixed section 80 is used as an anchor of a second movable body configured by the second movable electrode section 60 and the second coupling section 70. The second movable body including the second movable electrode section 60 seesaws around a rotation axis extending in the second direction DR2 with the second fixed section 80 as a fulcrum. For example, the second movable body swings, with the second support beam 82 extending in the second direction DR2 as a rotation axis, around the rotation axis while torsionally deforming the second support beam 82. Consequently, the second element section 92 having a one-side seesaw structure is realized.

That is, whereas the first movable body including the first movable electrode section 20 seesaws with the first fixed section 40 located further in the first direction DR1 than the first movable electrode section 20 as the fulcrum, the second movable body including the second movable electrode section 60 seesaws with the second fixed section 80 located further on the opposite side in the first direction DR1 than the second movable electrode section 60 as the fulcrum. In the plane view in the third direction DR3 orthogonal to the substrate 2, the first movable electrode section 20, the first coupling section 30, and the first fixed section 40 are disposed in the first direction DR1 in the order of the first movable electrode section 20, the first coupling section 30, and the first fixed section 40. The second movable electrode section 60, the second coupling section 70, and the second fixed section 80 are disposed in the opposite direction of the first direction DR1 in the order of the second movable electrode section 60, the second coupling section 70, and the second fixed section 80. Therefore, the first element section 91 is disposed point-symmetrically to the second element section 92 with respect to a virtual point between the first fixed section 40 and the second fixed section 80. Specifically, the first fixed section 40 is disposed point-symmetrically to the second fixed section 80 and the first movable electrode section 20 is disposed point-symmetrically to the second movable electrode section 60 with respect to the virtual point.

The first coupling section 30 couples the other ends of the first support beams 42 and the first movable electrode section 20. Specifically, the other ends of the two first support beams 42, one ends of which are coupled to the first fixed section 40, are coupled to the first coupling section 30. The second coupling section 70 couples the other ends of the second support beams 82 and the second movable electrode section 60. Specifically, the other ends of the two second support beams 82, one ends of which are coupled to the second fixed section 80, are coupled to the second coupling section 70.

The first coupling section 30 includes a first portion 31 disposed in the second direction DR2 side by side with the first support beams 42 and a second portion 32 coupled to the first portion 31 and the first movable electrode section 20 and disposed in the first direction DR1. The first coupling section 30 includes a third portion 33 coupled to the second portion 32 and disposed in the second direction DR2. The first portion 31 is coupled to the other ends of the two first support beams 42, to one ends of which the first fixed section 40 is coupled. One end of the second portion 32 is coupled to the first portion 31. The other end of the second portion 32 is coupled to the third portion 33 and the first movable electrode section 20. The first portion 31, the second portion 32, and the third portion 33 of the first coupling section 30 function as mass sections of the first movable body. In particular, the third portion 33 present at a far distance from the first support beams 42 serving as a rotation axis of the first movable body is a mass section effective for sensitivity improvement.

The second coupling section 70 includes a fourth portion 71 disposed in the second direction DR2 side by side with the second support beams 82 and a fifth portion 72 coupled to the fourth portion 71 and the second movable electrode section 60 and disposed in the first direction DR1. The second coupling section 70 includes a sixth portion 73 coupled to the fifth portion 72 and disposed in the second direction DR2. The fourth portion 71 is coupled to the other ends of the two second support beams 82, to one ends of which the second fixed section 80 is coupled. One end of the fifth portion 72 is coupled to the fourth portion 71. The other end of the fifth portion 72 is coupled to the sixth portion 73 and the second movable electrode section 60. The fourth portion 71, the fifth portion 72, and the sixth portion 73 of the second coupling section 70 function as mass sections of the second movable body. In particular, the sixth portion 73 present at a far distance from the second support bean 82 serving as a rotation axis of the second movable body is a mass section effective for sensitivity improvement.

Figure 2:
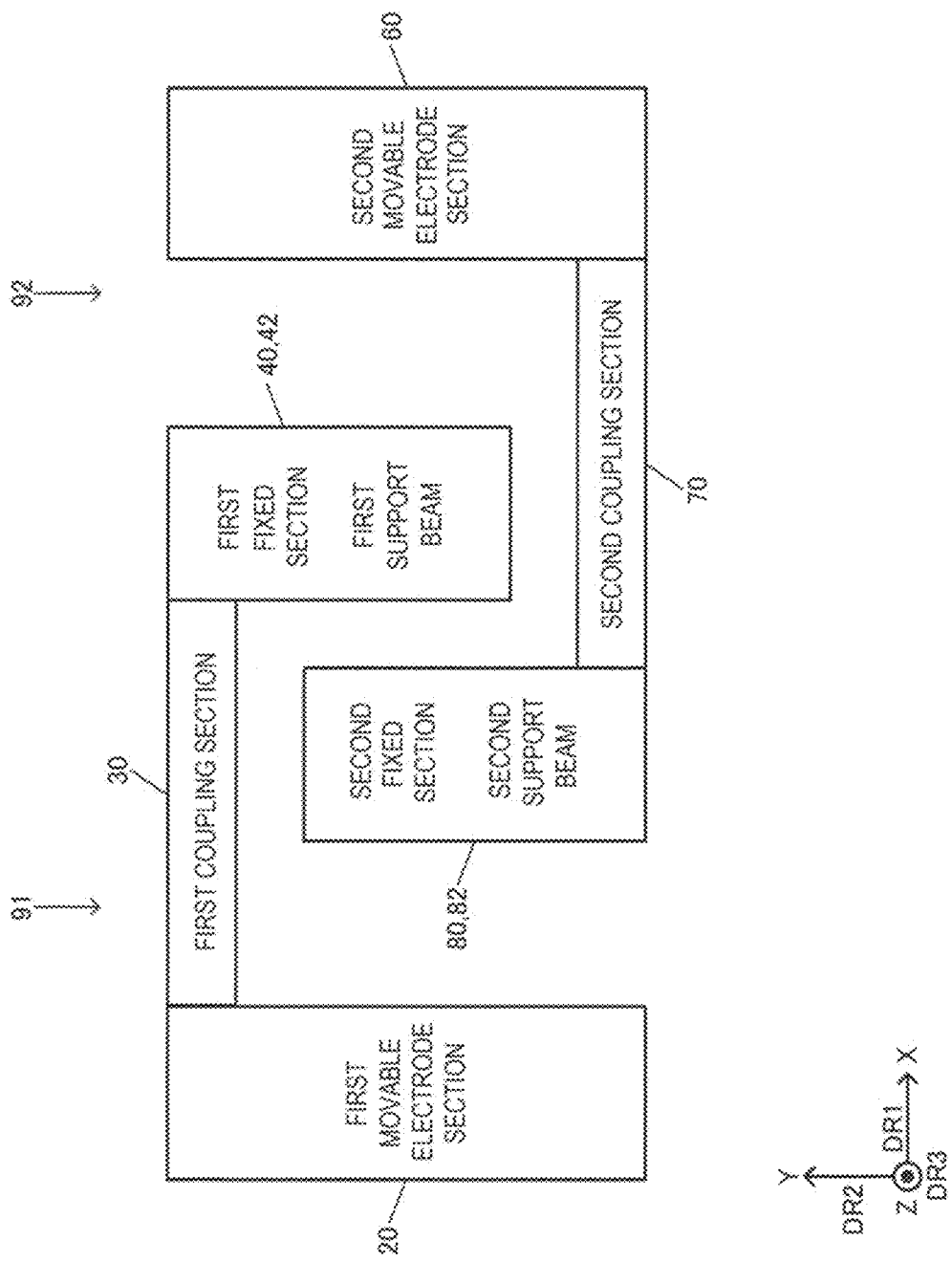
FIG. 2 is an explanatory diagram of the disposition of the physical quantity sensor.

As explained above, the physical quantity sensor 1 in this embodiment includes the first fixed electrode section 10 and the second fixed electrode section 50 provided on the substrate 2, the first movable electrode section 20 provided such that the movable electrodes are opposed to the fixed electrodes of the first fixed electrode section 10, and the second movable electrode section 60 provided such that the movable electrodes are opposed to the fixed electrodes of the second fixed electrode section 50. The physical quantity sensor 1 includes the first fixed section 40 and the second fixed section 80 fixed to the substrate 2, the first support beams 42, one ends of which are coupled to the first fixed section 40, the first coupling section 30 that couples the other ends of the first support beams 42 and the first movable electrode section 20, the second support beams 82, one ends of which are coupled to the second fixed section 80, and the second coupling section 70 that couples the other ends of the second beams 82 and the second movable electrode section 60. As shown in FIGS. 1 and 2, in the plane view in the third direction DR3 orthogonal to the substrate 2, the first movable electrode section 20, the second fixed section 80, the first fixed section 40, and the second movable electrode section 60 are disposed in the first direction DR1 in the order of the first movable electrode section 20, the second fixed section 80, the first fixed section 40, and the second movable electrode section 60.

With such a physical quantity sensor 1, the second fixed section 80 of the second element section 92 can be disposed using a space between the first fixed section 40 of the first element section 91 and the first movable electrode section 20. The first fixed section 40 of the first element section 91 can be disposed using a space between the second fixed section 80 of the second element section 92 and the second movable electrode section 60. Therefore, the first movable electrode section 20, the second fixed section 80, the first fixed section 40, and the second movable electrode section 60 can be compactly disposed side by side in the first direction DR1. A reduction in the size of the physical quantity sensor 1 can be realized. The first fixed section 40 and the second fixed section 80 can be disposed close to each other. Deterioration in accuracy due to the influence of a warp of the substrate 2 or the like of the physical quantity sensor 1 can be suppressed. Improvement of accuracy of the physical quantity sensor 1 can be realized. Therefore, both of the reduction in the size and the improvement of accuracy of the physical quantity sensor 1 can be realized.

With the physical quantity sensor 1 in this embodiment, the first movable electrode section 20 functioning as the mass section can be disposed to be separated from the first fixed section 40 and the first support beams 42 by the width of a space in which the second fixed section 80 and the second support beams 82 are disposed. Therefore, displacement of the first movable electrode section 20 at the time when acceleration or the like is applied can be increased. Improvement of sensitivity of detection of acceleration or the like in the first element section 91 can be realized. The second movable electrode section 60 functioning as the mass section can be disposed to be separated from the second fixed section 80 and the second support beams 82 by the width of a space in which the first fixed section 40 and the first support beams 42 are disposed. Therefore, displacement of the second movable electrode section 60 at the time when acceleration or the like is applied can be increased. Improvement of sensitivity of detection of acceleration or the like in the second element section 92 can be realized. Therefore, both of the reduction in the size and the improvement of accuracy of the physical quantity sensor 1 can be realized.

More specifically, in FIGS. 1 and 2, in the plane view in the third direction DR3, the first movable electrode section 20, the second fixed section 80 and the second support beams 82, the first fixed section 40 and the first support beams 42, and the second movable electrode section 60 are disposed side by side in the first direction DR1 in this order. Consequently, the second fixed section 80 and the second support beams 82 can be disposed using a space between the first fixed section 40 and the first support beams 42 and the first movable electrode section 20. The first fixed section 40 and the first support beams 42 can be disposed using a space between the second fixed section 80 and the second support beams 82 and the second movable electrode section 60. Therefore, the first movable electrode section 20, the second fixed section 80 and the second support beams 82, the first fixed section 40 and the first support beams 42, and the second movable electrode section 60 can be compactly disposed side by side in the first direction DR1. A reduction in the size of the physical quantity sensor 1 can be realized.

For example, in the physical quantity sensor disclosed in Patent Literature 1 explained above, the first element section and the second element section, each of which is formed in the one-side seesaw structure, are disposed in parallel in the Y-axis direction and the thicknesses in the Z-axis direction of the movable electrode and the fixed electrode are respectively set such that differential detection can be performed. In the physical quantity sensor, in the element sections having the one-side seesaw structure, rotation torque easily occurs because mass concentrates on one side. Improvement of sensitivity is realized by adopting a two-element configuration. However, in the configuration in which the first element section and the second element section are disposed in parallel in the Y-axis direction as in Patent Literature 1, a dead space is easily formed and it is difficult to reduce size. When acceleration is applied in other axis direction different from the Z-axis direction such as the X-axis direction, an opposing area between the movable electrode and the fixed electrode increases in one of the first element section and the second element section and the opposing area decreases in the other of the first element section and the second element section. Therefore, the opposing areas cannot be offset. Other axis sensitivity is deteriorated. Since the distance between the first fixed section of the first element section and the second fixed section of the second element section is large, the first element section and the second element section are easily affected by a warp of the substrate or the like. It is difficult to perform accurate detection.

As a first comparative example of this embodiment, a physical quantity sensor not having the one-side seesaw structure but having a seesaw structure in which detecting sections, movable electrodes and fixed electrodes of which are opposed, are provided on both sides of a rotation axis is conceivable. However, in this first comparative example, displacement less easily occurs even if the detection sections are simply doubled compared with the one-side seesaw structure. Therefore, sensitivity is not simply doubled. Specifically, in the seesaw structure of the first comparative example, rotation torque represented by mass×distance is in an offset relation in symmetry regions with respect to the rotation axis in the movable body and only an asymmetry portion can contribute to the rotation torque. Therefore, as a method of improving sensitivity, there is a method of increasing the asymmetry portion in size. However, in this method, improvement of sensitivity is difficult when compared with sensitivity of the one-side seesaw structure in the same area. As another method, there is a method of reducing spring rigidity of the torsion spring to gain displacement. However, shock resistance is deteriorated when compared with shock resistance of the one-side seesaw structure in the same sensitivity.

As a second comparative example of this embodiment, a physical quantity sensor in which the first fixed section, the second movable electrode section, the first movable electrode section, and the second fixed section are disposed side by side in the second direction in this order is conceivable. However, in this second comparative example, since the distance between the first fixed section and the second fixed section is large, if a warp occurs in the substrate because of stress, influence due to the warp is different in the first fixed section and the second fixed section. The influence on the individual element sections cannot be offset. Therefore, the element sections are easily affected by thermal stress and external stress.

In this regard, in this embodiment, for example, in a Z-axis acceleration sensor having, for example, an area change type structure by out-of-plane mobility of a fixed electrode and a movable electrode having different thicknesses, the one-side seesaw structure is realized, the one-side seesaw structure being a structure in which a support beam, which is a torsion spring, and a portion of a movable body up to a movable electrode section are opened is realized. A two-element configuration such as the first element section 91 and the second element section 92 is adopted, the two-element configuration being a configuration in which a fixed section and a support beam of the other element section are disposed in an opening section of one element section. In the one-side seesaw structures, movable electrodes are extended on both sides in an in-plane direction orthogonal to a rotation axis.

Specifically, the physical quantity sensor 1, which is the Z-axis acceleration sensor of the area change type shown in FIG. 1, includes the first fixed electrode section 10, the second fixed electrode section 50, the first fixed section 40, and the second fixed section 80 fixed to the substrate 2, which is a support substrate. The physical quantity sensor 1 includes the first movable electrode section 20 and the first coupling section 30, which are the first movable body, the second movable electrode section 60 and the second coupling section 70, which are the second movable body, the first support beams 42 coupled to the first coupling section 30 of the first movable body and the first fixed section 40, and the second support beams 82 coupled to the second coupling section 70 of the second movable body and the second fixed section 80. The first movable electrode section 20 includes the first movable electrodes 21 and the second movable electrodes 22 extending to both sides in the first direction DR1 from a first base movable electrode 23 of the first movable body. The second movable electrode section 60 includes the third movable electrodes 61 and the fourth movable electrodes 62 extending to both sides in the first direction DR1 from a second base movable electrode 63 of the second movable body.

Figure 5:
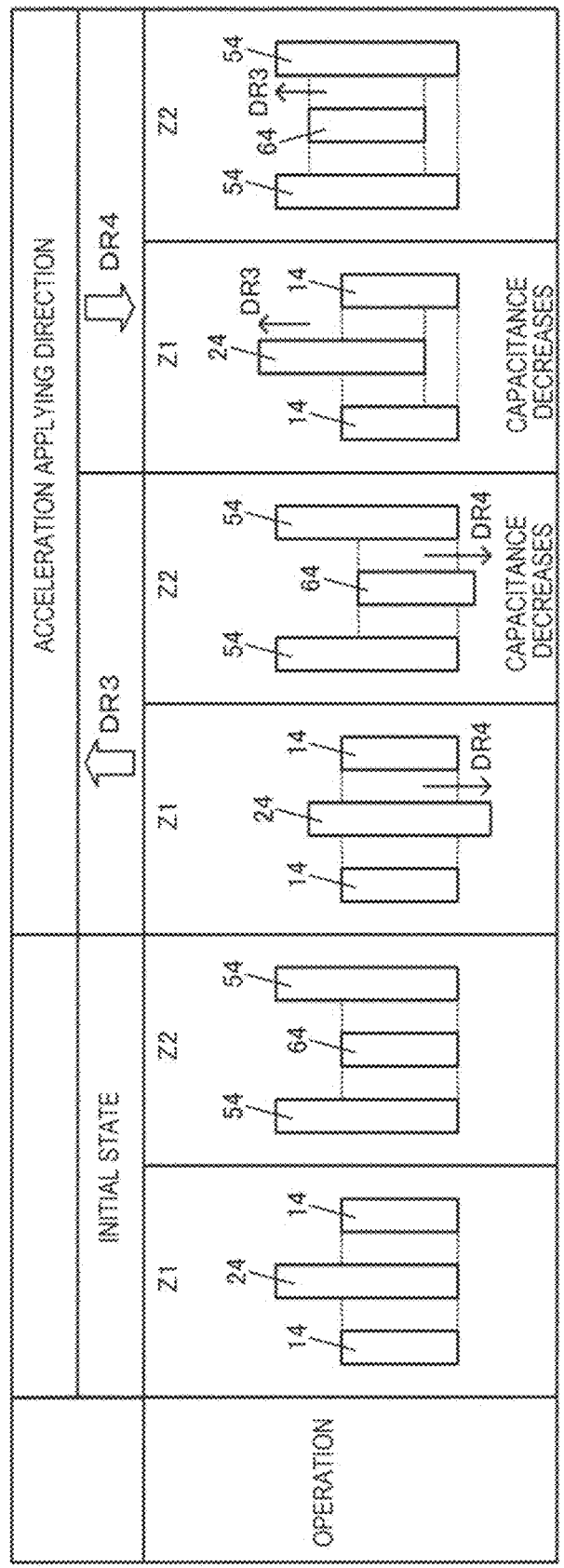
FIG. 5 is an explanatory diagram of the operation of detecting sections.

In the physical quantity sensor 1 shown in FIG. 1, when acceleration in the Z-axis direction is applied, the first movable body of the first element section 91 rotates with the first support beams 42, which are the torsion springs, as a rotation axis and the second movable body of the second element section 92 rotates with the second support beams 82, which are the torsion springs, as a rotation axis. In one detecting section of the detecting section Z1 of the first element section 91 and the detecting section Z2 of the second element section 92, the opposing area between the movable electrode and the fixed electrode decreases. In the other detecting section, the opposing area is constant or increases. Referring to FIG. 5 as an example, when acceleration in the third direction DR3, which is a Z-axis direction plus side, is applied, the opposing area of the detecting section Z2 of the second element section 92 decreases and the opposing area of the detecting section Z1 of the first element section 91 does not change and is constant. On the other hand, when acceleration in a fourth direction DR4, which is a Z-axis direction minus side and the opposite direction of the third direction DR3, is applied, the opposing area of the detecting section Z1 of the first element section 91 decreases and the opposing area of the detecting section Z2 of the second element section 92 does not change and is constant. By detecting a change in capacitance due to a change in the opposing area between the movable electrode and the fixed electrode, the magnitude and the direction of applied acceleration can be detected.

As a characteristic of the structure of the physical quantity sensor 1 shown in FIG. 1, the one-side seesaw structure in which a portion of the movable body from the support beam to the movable electrode section is opened is adopted. For example, the first element section 91 is formed in the one-side seesaw structure in which a portion of the first movable body from the first support beams 42 to the first movable electrode section 20 is opened. Specifically, a region surrounded by the first portion 31, the second portion 32, and the third portion 33 of the first coupling section 30 is an opening section. The second fixed section 80 and the second support beams 82 of the second element section 92 are disposed in the opening section. The second element section 92 is formed in the one-side seesaw structure in which a portion of the second movable body from the second support beams 82 to the second movable electrode section 60 is opened. Specifically, a region surrounded by the fourth portion 71, the fifth portion 72, and the sixth portion 73 of the second coupling section 70 is an opening section. The first fixed section 40 and the first support beams 42 of the first element section 91 are disposed in the opening section.

In the one-side seesaw structure shown in FIG. 1, compared with the normal seesaw structure, the mass of the entire first and second movable bodies contribute as rotation torque represented by mass×distance. Therefore, displacement can be gained, which is advantageous in improvement of sensitivity.

In FIG. 1, portions of the movable bodies are opened. However, since contribution of mass at a farther distance to the rotation torque is larger, even if a part of mass close to the rotation axis is absent, displacement does not greatly decrease. Therefore, a decrease in sensitivity is little. For example, in the first element section 91, a portion surrounded by the first portion 31, the second portion 32, and the third portion 33 of the first coupling section 30 is an opening section. Mass is absent in the opening section. However, since the opening section is located at a short distance from the first support beams 42, which are the rotation axis, a decrease in sensitivity by providing the opening section is little. For example, in the first element section 91, since the first movable electrode section 20, the third portion 33, and the like function as mass sections far from the first support beams 42, which are the rotation axis, improvement of sensitivity can be realized. In the second element section 92, a portion surrounded by the fourth portion 71, the fifth portion 72, and the sixth portion 73 of the second coupling section 70 is an opening section. Mass is absent in the opening section. However, since the opening section is located at a short distance from the second support beams 82, which are the rotation axis, a decrease in sensitivity by providing the opening section is little. For example, in the second element section 92, since the second movable electrode section 60 and the sixth portion 73 function as mass sections far from the second support beams 82, which are the rotation axis, improvement of sensitivity can be realized.

In FIG. 1, the fixed section and the support beam of the other element section are disposed in the opening section of the movable body of one element section using the first element section 91 and the second element section 92 of such a structure. For example, the second fixed section 80 and the second support beams 82 of the second element section 92 are disposed in the region surrounded by the first portion 31, the second portion 32, and the third portion 33, which is the opening section of the first movable body of the first element section 91. The first fixed section 40 and the first support beams 42 of the first element section 91 are disposed in the region surrounded by the fourth portion 71, the fifth portion 72, and the sixth portion 73, which is the opening section of the second movable body of the second element section 92. By adopting such a structure, the space formed as the dead space in Patent Literature 1 explained above can be effectively used. Therefore, a reduction in the size of the physical quantity sensor 1 can be realized.

In FIG. 1, the first fixed section 40 and the second fixed section 80, which are the anchors, are disposed close to each other. Therefore, even if a warp of the substrate 2 is caused by stress, the warp affects the fixed sections in the same manner. Therefore, influence in the individual element sections can be offset. It is possible to realize a structure that is less easily affected by thermal stress and external stress.

In FIG. 1, the movable electrode section is formed in a structure in which the two movable electrodes extend to both sides from the base movable electrode. Therefore, since the opposing area between the movable electrode and the fixed electrode does not change with respect to application of acceleration in the other axis direction of the length direction of the movable electrode, deterioration in the other axis sensitivity can be suppressed. For example, in the first movable electrode section 20, the first movable electrodes 21 and the second movable electrodes 22 extend to both sides in the first direction DR1 from the first base movable electrode 23 extending in the second direction DR2. Therefore, since an opposing area between the first movable electrodes 21, the second movable electrodes 22 and the first fixed electrodes 11, the second fixed electrodes 12 does not change with respect to application of acceleration, for example, in the direction of the X axis, which is the other axis of the Z axis, deterioration in the other axis sensitivity can be suppressed. In the second movable electrode section 60, the third movable electrodes 61 and the fourth movable electrodes 62 extend to both sides in the first direction DR1 from the second base movable electrode 63 extending in the second direction DR2. Therefore, since an opposing area between the third movable electrodes 61, the fourth movable electrodes 62 and the third fixed electrodes 51, the fourth fixed electrodes 52 does not change with respect to application of acceleration, for example, in the direction of the X axis, which is the other axis, deterioration in the other axis sensitivity can be suppressed.

Figure 3:
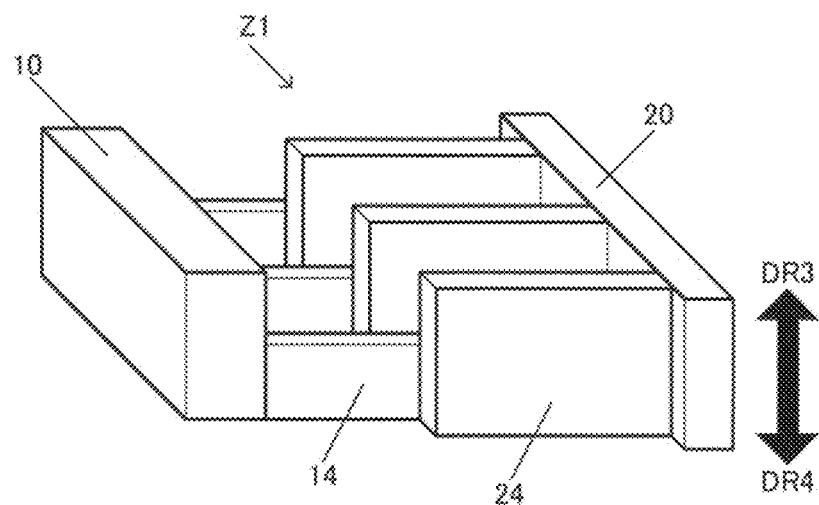
FIG. 3 is an explanatory diagram of the operation of detecting sections.
Figure 4:
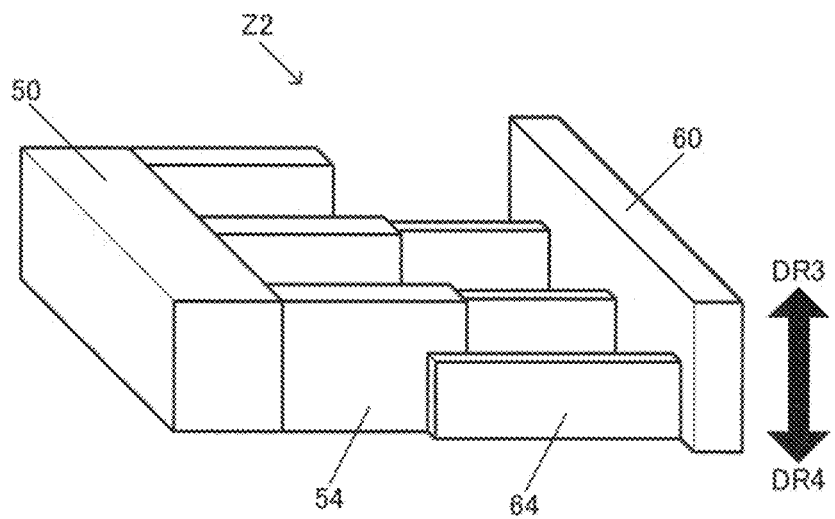
FIG. 4 is an explanatory diagram of the operation of detecting sections.

FIGS. 3 to 5 are explanatory diagrams of the operations of the detecting sections Z1 and Z2 in which the movable electrodes and the fixed electrodes are opposed. In the detecting sections Z1 and Z2, the thicknesses in the third direction DR3 of the movable electrodes and the fixed electrodes are different. Specifically, as shown in FIG. 3, in the detecting section Z1, the thickness in the third direction DR3 of the movable electrodes 24 of the first movable electrode section 20 is larger than the thickness in the third direction DR3 of the fixed electrodes 14 of the first fixed electrode section 10. On the other hand, as shown in FIG. 4, in the detecting section Z2, the thickness in the third direction DR3 of the movable electrodes 64 of the second movable electrode section 60 is smaller than the thickness in the third direction DR3 of the fixed electrodes 54 of the second fixed electrode section 50. The movable electrodes 24 shown in FIG. 3 correspond to the first movable electrodes 21 and the second movable electrodes 22 shown in FIG. 1. The fixed electrodes 14 shown in FIG. 3 correspond to the first fixed electrodes 11 and the second fixed electrodes 12 shown in FIG. 1. The movable electrodes 64 shown in FIG. 4 correspond to the third movable electrodes 61 and the fourth movable electrodes 62 shown in FIG. 1. The fixed electrodes 54 shown in FIG. 4 correspond to the third fixed electrodes 51 and the fourth fixed electrodes 52 shown in FIG. 1.

As shown in FIG. 5, in an initial state, in a side view in the second direction DR2, the positions of the end portions on the fourth direction DR4 side of the movable electrodes 24 and the fixed electrodes 14 coincide and the end portions are flush. The positions of the end portions on the fourth direction DR4 side of the movable electrodes 64 and the fixed electrodes 54 also coincide and the end portions are flush. The initial state is a state at the time when acceleration is not applied and is a stationary state. The fourth direction DR4 is the opposite direction of the third direction DR3 and is, for example, a direction on a Z-axis direction minus side.

When acceleration in the third direction DR3 is applied in the initial state, as shown in FIG. 5, the movable electrodes 24 and 64 are displaced to the fourth direction DR4 side, which is the opposite direction of the third direction DR3. Consequently, in the detecting section Z2, an opposing area between the movable electrodes 64 and the fixed electrodes 54 decreases. In the detecting section Z1, an opposing area between the movable electrodes 24 and the fixed electrodes 14 is maintained constant. Therefore, the acceleration in the third direction DR3 can be detected by detecting a change in capacitance due to the decrease in the opposing area in the detecting section Z2. On the other hand, when acceleration in the fourth direction DR4 is applied in the initial state, as shown in FIG. 5, the movable electrodes 24 and 64 are displaced to the third direction DR3 side. Consequently, in the detecting section Z1, the opposing area between the movable electrodes 24 and the fixed electrodes 14 decreases. In the detecting section Z2, the opposing area between the movable electrodes 64 and the fixed electrodes 54 is maintained constant. Therefore, the acceleration in the fourth direction DR4 can be detected by detecting a change in capacitance due to the decrease in the opposing area in the detecting section Z1. Specifically, the movable electrodes 24 are electrically coupled to a first input terminal for differential amplification, a differential detection circuit to which the movable electrodes 64 are electrically coupled is provided in a second input terminal for differential amplification, and the acceleration in the third direction DR3 and the acceleration in the fourth direction DR4 are detected by the differential detection circuit. One input terminal of the first input terminal and the second input terminal of the differential detection circuit is an inverted input terminal and the other input terminal is a noninverting input terminal.

In FIGS. 3 to 5, in the initial state, the end portions on the fourth direction DR4 side of the movable electrodes 24 and 64 and the fixed electrodes 14 and 54 coincide and are flush. However, this embodiment is not limited to this. For example, in the initial state, in the detecting section Z1, the movable electrodes 24 may be offset and displaced to the third direction DR3 side to prevent one ends on the third direction DR3 side and the other ends on the fourth direction DR4 side of the movable electrodes 24 and the fixed electrodes 14 from coinciding. In the detecting section Z2, the movable electrodes 64 may be offset and displaced to the fourth direction DR4 side to prevent one ends on the third direction DR3 side and the other ends on the fourth direction DR4 side of the movable electrodes 64 and the fixed electrodes 54 from coinciding. Consequently, for example, when acceleration is applied in the third direction DR3, the opposing area increases and the capacitance increases in the detecting section Z1 and the opposing area decreases and the capacitance decreases in the detecting section Z2. On the other hand, when acceleration is applied in the fourth direction DR4, the opposing area decreases and the capacitance decreases in the detecting section Z1 and the opposing area increases and the capacitance increases in the detecting section Z2. Consequently, since a ratio of a change in the capacitance to a change in the acceleration increases, it is possible to realize the physical quantity sensor 1 having higher sensitivity.

As explained above, in this embodiment, the movable electrodes 24 of the first movable electrode section 20 and the fixed electrodes 14 of the first fixed electrode section 10 are opposed in the second direction DR2. The movable electrodes 64 of the second movable electrode section 60 and the fixed electrodes 54 of the second fixed electrode section 50 are opposed in the second direction DR2. For example, movable electrodes of a movable electrode group of the first movable electrode section 20 and fixed electrodes of a fixed electrode group of the first fixed electrode section 10 are opposed in the second direction DR2. The movable electrodes of the movable electrode group of the second movable electrode section 60 and the fixed electrodes of the fixed electrode group of the second fixed electrode section 50 are opposed in the second direction DR2.

Consequently, for example, a change in a physical quantity such as acceleration in the third direction DR3 orthogonal to the second direction DR2 can be measured by detecting a change in the capacitance due to a change in an opposing area between the first movable electrode section 20 and the first fixed electrode section 10 and a change in capacitance due to a change in an opposing area between the second movable electrode section 60 and the second fixed electrode section 50.

In this embodiment, as shown in FIG. 1, the first movable electrode section 20 includes the first base movable electrode 23, the first movable electrodes 21 extending in the first direction DR1 from the first base movable electrode 23, and the second movable electrodes 22 extending in the opposite direction of the first direction DR1 from the first base movable electrode 23. The first fixed electrode section 10 includes the first fixed electrodes 11 opposed to the first movable electrodes 21 and the second fixed electrodes 12 opposed to the second movable electrodes 22. The first base movable electrode 23 is, for example, a portion extending, for example, in the second direction DR2 from one end of the first coupling section 30 and is a portion functioning as a base of the movable electrode group of the first movable electrode section 20.

Consequently, when a physical quantity such as acceleration, for example, in the first direction DR1, which is the other axis direction, changes, for example, one opposing area of an opposing area between the first movable electrodes 21 and the first fixed electrodes 11 and an opposing area between the second movable electrodes 22 and the second fixed electrodes 12 decreases and the other opposing area increases. Therefore, changes in the opposing areas can be offset when the physical quantity such as acceleration in the other axis direction changes. Deterioration in the other axis sensitivity can be suppressed.

In this embodiment, as shown in FIG. 1, the second movable electrode section 60 includes the second base movable electrode 63, the third movable electrodes 61 extending in the first direction DR1 from the second base movable electrode 63, and the fourth movable electrodes 62 extending in the opposite direction of the first direction DR1 from the second base movable electrode 63. The second fixed electrode section 50 includes the third fixed electrodes 51 opposed to the third movable electrodes 61 and the fourth fixed electrodes 52 opposed to the fourth movable electrodes 62. The second base movable electrode 63 is, for example, a portion extending, for example, in the second direction DR2 from one end of the second coupling section 70 and is a portion functioning as a base of the movable electrode group of the second movable electrode section 60.

Consequently, when the physical quantity such as acceleration, for example, in the first direction DR1, which is the other axis direction, changes, for example, one opposing area of an opposing area between the third movable electrodes 61 and the third fixed electrodes 51 and an opposing area between the fourth movable electrodes 62 and the fourth fixed electrodes 52 decreases and the other opposing area increases. Therefore, changes in the opposing areas can be offset when the physical quantity such as acceleration in the other axis direction changes. Deterioration in the other axis sensitivity can be suppressed.

In this embodiment, as shown in FIG. 5, when the first movable electrode section 20 and the second movable electrode section 60 are displaced in the third direction DR3, capacitance between the first movable electrode section 20 and the first fixed electrode section 10 decreases. Specifically, when acceleration or the like is applied to the fourth direction DR4 side and the first movable electrode section 20 and the second movable electrode section 60 are displaced in the third direction DR3, the opposing area between the movable electrodes 24 of the first movable electrode section 20 and the fixed electrodes 14 of the first fixed electrode section 10 decreases and the capacitance between the first movable electrode section 20 and the first fixed electrode section 10 decreases. At this time, capacitance between the second movable electrode section 60 and the second fixed electrode section 50 may be maintained constant as shown in FIG. 5 or may increase.

As shown in FIG. 5, when the first movable electrode section 20 and the second movable electrode section 60 are displaced in the fourth direction DR4, which is the opposite direction of the third direction DR3, the capacitance between the second movable electrode section 60 and the second fixed electrode section 50 decreases. Specifically, when acceleration or the like is applied to the third direction DR3 side and the first movable electrode section 20 and the second movable electrode section 60 are displaced in the fourth direction DR4, the opposing area between the movable electrodes 64 of the second movable electrode section 60 and the fixed electrodes 54 of the second fixed electrode section 50 decreases and the capacitance between the second movable electrode section 60 and the second fixed electrode section 50 decreases. At this time, the capacitance between the first movable electrode section 20 and the first fixed electrode section 10 may be maintained constant as shown in FIG. 5 or may increase.

Consequently, by detecting, for example, a decrease in the capacitance between the first movable electrode section 20 and the fixed electrode section 10, it is possible to detect that the first movable electrode section 20 and the second movable electrode section 60 are displaced in the third direction DR3. By detecting, for example, a decrease in the capacitance between the second movable electrode section 60 and the second fixed electrode section 50, it is possible to detect that the first movable electrode section 20 and the second movable electrode section 60 are displaced in the fourth direction DR4. Therefore, it is possible to detect, at high sensitivity or the like, displacement in the third direction DR3 and the fourth direction DR4 of the first movable electrode section 20 and the second movable electrode section 60.

2. Other Configuration Examples

Figure 6:
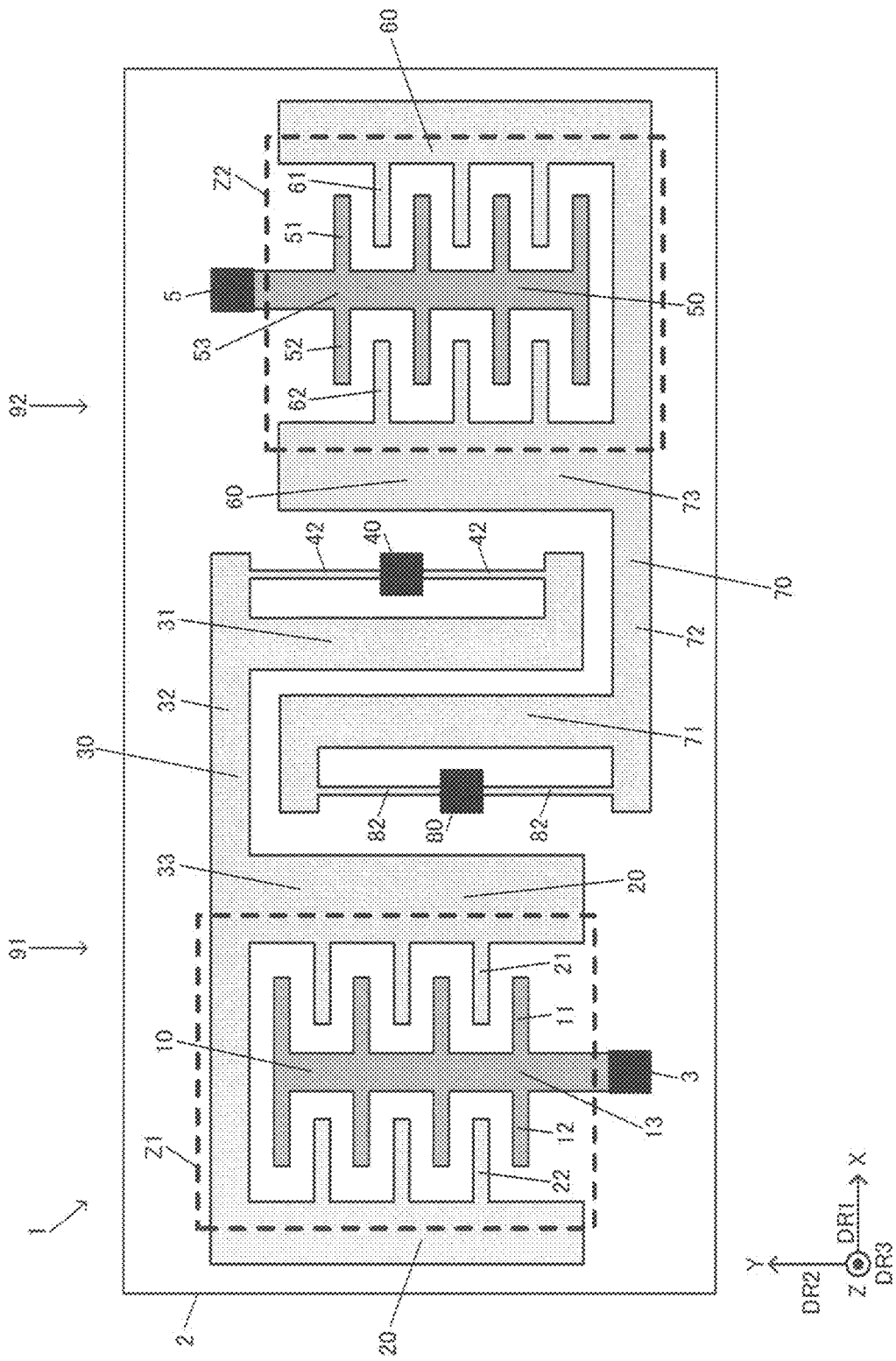
FIG. 6 is a plan view showing another configuration example of the physical quantity sensor.

Subsequently, various configuration examples of this embodiment are explained. Another configuration example of the physical quantity sensor 1 is shown in FIG. 6. In FIG. 1, the movable electrodes extend to both sides from the base movable electrode. However, in FIG. 6, the fixed electrodes extend to both sides from the base fixed electrode.

Specifically, in FIG. 6, the first fixed electrode section 10 includes a first base fixed electrode 13, the first fixed electrodes 11 extending in the first direction DR1 from the first base fixed electrode 13, and the second fixed electrodes 12 extending in the opposite direction of the first direction DR1 from the first base fixed electrode 13. The first movable electrode section 20 includes the first movable electrodes 21 opposed to the first fixed electrodes 11 and the second movable electrodes 22 opposed to the second fixed electrodes 12. The first base fixed electrode 13 is, for example, a portion extending, for example, in the second direction DR2 from the fixed section 3 of the first fixed electrode section 10 and is a portion functioning as a base of the fixed electrode group of the first fixed electrode section 10. For example, in FIG. 1, the first fixed electrode section 10 is supported at two points by the two fixed sections 3 and 4. However, in FIG. 6, the first fixed electrode section 10 is supported at one point by one fixed section 3.

Consequently, when a physical quantity such as acceleration, for example, in the first direction DR1, which is the other axis direction, changes, for example, one opposing area of the opposing area between the first movable electrodes 21 and the first fixed electrodes 11 and the opposed area between the second movable electrodes 22 and the second fixed electrodes 12 decreases and the other opposing area increases. Therefore, changes in the opposing areas can be offset when the physical quantity such as acceleration in the other axis direction changes. Deterioration in the other axis sensitivity can be suppressed.

In FIG. 6, the second fixed electrode section 50 includes a second base fixed electrode 53, the third fixed electrodes 51 extending in the first direction DR1 from the second base fixed electrode 53, and the fourth fixed electrodes 52 extending in the opposite direction of the first direction DR1 from the second base fixed electrode 53. The second movable electrode section 60 includes the third movable electrodes 61 opposed to the third fixed electrodes 51 and the fourth movable electrodes 62 opposed to the fourth fixed electrodes 52. The second base fixed electrode 53 is, for example, a portion extending, for example, in the second direction DR2 from the fixed section 5 of the second fixed electrode section 50 and is a portion functioning as a base of the fixed electrode group of the second fixed electrode section 50. For example, in FIG. 1, the second fixed electrode section 50 is supported at the two points by the two fixed sections 5 and 6. However, in FIG. 6, the second fixed electrode section 50 is supported at one point by one fixed section 5.

Consequently, when a physical quantity such as acceleration, for example, in the first direction DR1, which is the other axis direction, changes, for example, one opposing area of the opposing area between the first movable electrodes 21 and the first fixed electrodes 11 and the opposing area between the second movable electrodes 22 and the second fixed electrodes 12 decreases and the other opposing area increases. Therefore, changes in the opposing areas can be offset when the physical quantity such as acceleration in the other axis direction changes. Deterioration in the other axis sensitivity can be suppressed.

In FIG. 6, the first movable electrode section 20 is disposed on both sides of the first fixed electrode section 10 and the second movable electrode section 60 is disposed on both sides of the second fixed electrode section 50. Therefore, compared with FIG. 1, it is possible to gain the mass of the first movable body including the first movable electrode section 20 and the mass of the second movable body including the second movable electrode section 60. It is possible to realize improvement of sensitivity. In particular, a portion on the opposite direction side of the first direction DR1 of the first fixed electrode section 10 in the first movable electrode section 20 and a portion on the first direction DR1 side of the second fixed electrode section 50 in the second movable electrode section 60 function as mass sections far from the rotation axis. Therefore, it is possible to contribute to improvement of the sensitivity of the physical quantity sensor 1.

Figure 7:
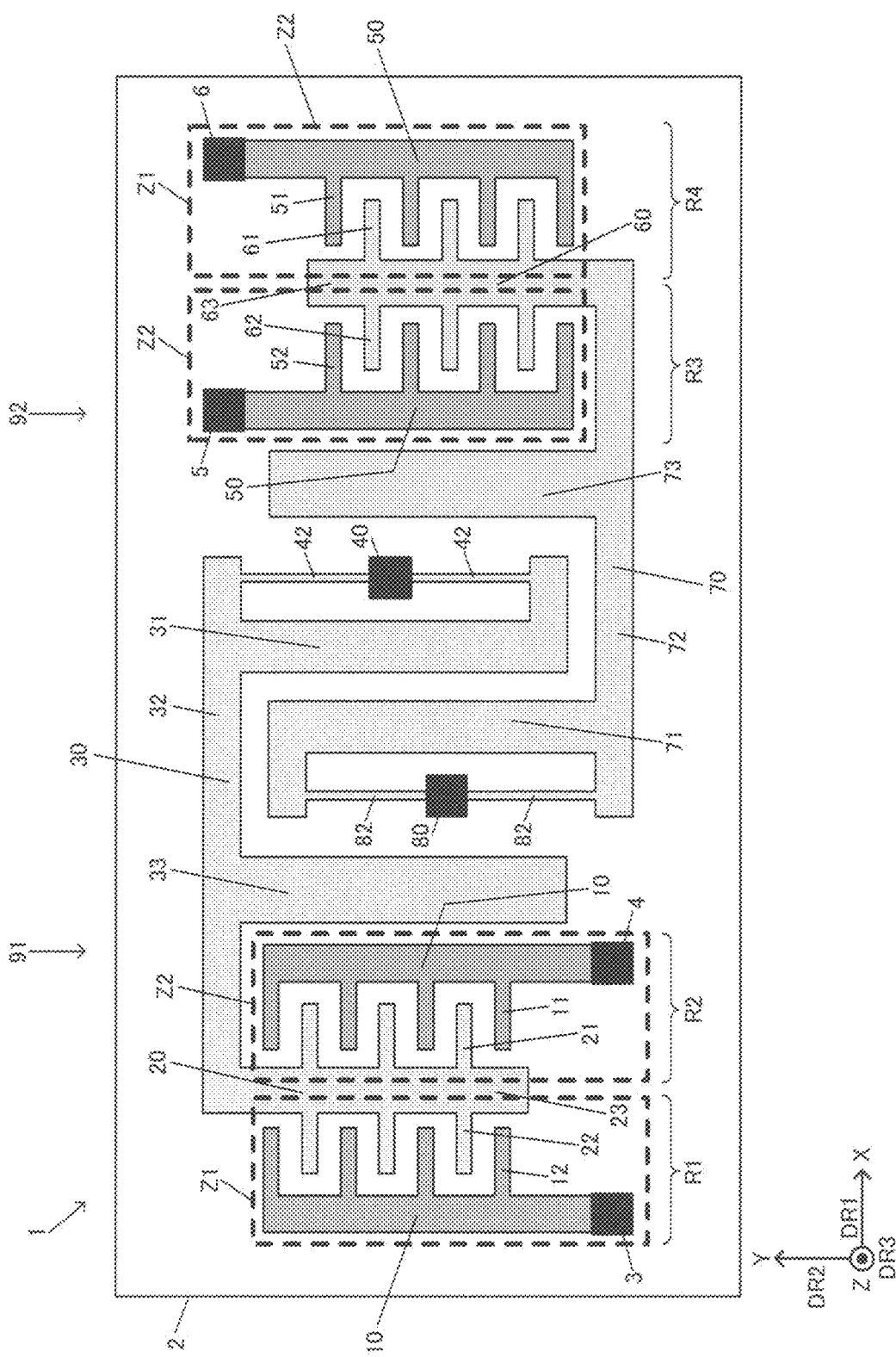
FIG. 7 is a plan view showing another configuration example of the physical quantity sensor.

Another configuration example of the physical quantity sensor 1 is shown in FIG. 7. In FIG. 1, one detecting section Z1 explained with reference to FIG. 3 is provided in a disposition region of the first movable electrode section 20 and the first fixed electrode section 10 of the first element section 91 and one detecting section Z2 explained with reference to FIG. 4 is provided in a disposition region of the second movable electrode section 60 and the second fixed electrode section 50 of the second element section 92. In contrast, in FIG. 7, two detecting sections, that is, the detecting section Z1 and the detecting section Z2, are provided in the disposition region of the first movable electrode section 20 and the first fixed electrode section 10 and two detecting sections, that is, the detecting section Z1 and the detecting section Z2, are provided in the disposition region of the second movable electrode section 60 and the second fixed electrode section 50.

As explained with reference to FIG. 5, the detecting section Z1 is a detecting section in which, for example, when acceleration in the fourth direction DR4 is applied, the movable electrodes 24 are displaced in the third direction DR3, whereby the opposing area between the movable electrodes 24 and the fixed electrodes 14 decreases and capacitance between the movable electrodes 24 and the fixed electrodes 14 decreases. The detecting section Z2 is a detecting section in which, for example, when acceleration in the third direction DR3 is applied, the movable electrodes 64 are displaced in the fourth direction DR4, whereby the opposing area between the movable electrodes 64 and the fixed electrodes 54 decreases and capacitance between the movable electrodes 64 and the fixed electrodes 54 decreases. That is, in the detecting section Z1, the capacitance decreases according to the acceleration in the fourth direction DR4. In the detecting section Z2, the capacitance decreases according to the acceleration in the third direction DR3. For example, as shown in FIG. 3, in the detecting section Z1, the thickness of the movable electrodes 24 in the third direction DR3 is larger than the thickness of the fixed electrodes 14. As shown in FIG. 4, in the detecting section Z2, the thickness of the movable electrodes 64 in the third direction DR3 is smaller than the thickness of the fixed electrodes 54.

In FIG. 7, the detecting section Z1 is disposed in a first region R1 and the detecting section Z2 is disposed in a second region R2 in the disposition region of the first movable electrode section 20 and the first fixed electrode section 10. The detecting section Z2 is disposed in a third region R3 and the detecting section Z1 is disposed in a fourth region R4 in the disposition region of the second movable electrode section 60 and the second fixed electrode section 50.

Therefore, in FIG. 7, when the first movable electrode section 20 and the second movable electrode section 60 are displaced in the third direction DR3 by, for example, acceleration in the fourth direction DR4, capacitance between the first movable electrode section 20 and the first fixed electrode section 10 disposed in the first region R1 in the disposition region of the first movable electrode section 20 and the first fixed electrode section 10 decreases. Capacitance between the second movable electrode section 60 and the second fixed electrode section 50 disposed in the fourth region R4 in the disposition region of the second movable electrode section 60 and the second fixed electrode section 50 decreases.

That is, as shown in FIG. 7, in the first region R1, the detecting section Z1 in which the opposing area between the first movable electrode section 20 and the first fixed electrode section 10 decreases when the first movable electrode section 20 changes in the third direction DR3 is disposed. The detecting section Z1 in which the thickness of the movable electrodes 24 in the third direction DR3 is larger than the thickness of the fixed electrodes 14, for example, as shown in FIG. 3 is disposed. Therefore, when the first movable electrode section 20 changes in the third direction DR3, the capacitance between the first movable electrode section 20 and the first fixed electrode section 10 disposed in the first region R1 decreases. The detecting section Z1 in which the opposing area between the second movable electrode section 60 and the second fixed electrode section 50 decreases when the second movable electrode section 60 changes in the third direction DR3 is disposed in the fourth region R4. Therefore, when the second movable electrode section 60 changes in the third direction DR3, the capacitance between the second movable electrode section 60 and the second fixed electrode section 50 disposed in the fourth region R4 decreases.

On the other hand, for example, when the first movable electrode section 20 and the second movable electrode section 60 are displaced in the fourth direction DR4, which is the opposite direction of the third direction DR3, by, for example, acceleration in the third direction DR3, capacitance between the first movable electrode section 20 and the first fixed electrode section 10 disposed in the second region R2 in the disposition region of the first movable electrode section 20 and the first fixed electrode section 10 decreases. Capacitance between the second movable electrode section 60 and the second fixed electrode section 50 disposed in the third region R3 in the disposition region of the second movable electrode section 60 and the second fixed electrode section 50 decreases.

That is, as shown in FIG. 7, the detecting section Z2 in which the opposing area between the first movable electrode section 20 and the first fixed electrode section 10 decreases when the first movable electrode section 20 changes in the fourth direction DR4 is disposed in the second region R2. The detecting section Z2 in which the thickness of the movable electrodes 24 in the third direction DR3 is smaller than the thickness of the fixed electrodes 14, for example, as shown in FIG. 4 is disposed. Therefore, when the first movable electrode section 20 changes in the fourth direction DR4, the capacitance between the first movable electrode section 20 and the first fixed electrode section 10 disposed in the second region R2 decreases. The detecting section Z2 in which the opposing area between the second movable electrode section 60 and the second fixed electrode section 50 decreases when the second movable electrode section 60 changes in the fourth direction DR4 is disposed in the third region R3. Therefore, when the second movable electrode section 60 changes in the fourth direction DR4, the capacitance between the second movable electrode section 60 and the second fixed electrode section 50 disposed in the third region R3 decreases.

Consequently, by detecting, for example, the decrease in the capacitance between the first movable electrode section 20 and the first fixed electrode section 10 in the first region R1 where the detecting section Z1 is disposed and the decrease in the capacitance between the second movable electrode section 60 and the second fixed electrode section 50 in the fourth region R4 where the detecting section Z1 is disposed, it is possible to detect that the first movable electrode section 20 and the second movable electrode section 60 are displaced in the third direction DR3 by, for example, acceleration in the fourth direction DR4. By detecting, for example, the decrease in the capacitance between the first movable electrode section 20 and the first fixed electrode section 10 in the second region R2 where the detecting section Z2 is disposed and the decrease in the capacitance between the second movable electrode section 60 and the second fixed electrode section 50 in the third region R3 where the detecting section Z2 is disposed, it is possible to detect that the first movable electrode section 20 and the second movable electrode section 60 are displaced in the fourth direction DR4 by, for example, acceleration in the third direction DR3.

As shown in FIGS. 3 and 4, when the thicknesses of the movable electrodes 24 and 64 in the third direction DR3 are differentiated in the detecting section Z1 and the detecting section Z2, in FIG. 7, the detecting sections Z1 and Z2 are respectively disposed in the first region R1 and the second region R2 of the first movable body and the detecting sections Z2 and Z1 are respectively disposed in the third region R3 and the fourth region R4 of the second movable body. Specifically, the detecting section Z1 in the first region R1 and the detecting section Z1 in the fourth region R4 are point-symmetrically disposed and the detecting section Z2 in the second region R2 and the detecting section Z2 in the third region R3 are point-symmetrically disposed, for example, with respect to the vicinity of the center of the physical quantity sensor 1. Therefore, it is possible to equalize the mass of the first movable body including the first movable electrode section 20 and the mass of the second movable body including the second movable electrode section 60. There is an advantage that a mass balance of the movable bodies is good.

In FIG. 7, the first region R1 and the second region R2 are regions arranged side by side in the first direction DR1 in the disposition region of the first movable electrode section 20 and the first fixed electrode section 10. The third region R3 and the fourth region R4 are regions arranged side by side in the first direction DR1 in the disposition region of the second movable electrode section 60 and the second fixed electrode section 50.

Consequently, for example, when the first movable body and the second movable body move, for example, in the first direction DR1, which is the other axis direction, capacitance in the first region R1 where the detecting section Z1 is disposed decreases and, on the other hand, capacitance in the second region R2 where the detecting section Z2 is disposed increases. Therefore, changes in the capacitance are offset and deterioration in the other axis sensitivity can be suppressed. Capacitance in the third region R3 where the detecting section Z2 is disposed decreases and, on the other hand, capacitance in the fourth region R4 where the detecting section Z1 is disposed increases. Therefore, changes in the capacitance are offset and deterioration in the other axis sensitivity can be suppressed.

In FIG. 7, the detecting sections are disposed in the order of the detecting sections Z1, Z2, Z2, and Z1 in the first direction DR1. However, the detecting sections may be disposed in the order of, for example, the detecting sections Z2, Z1, Z1, and Z2 in the first direction DR1.

Figure 8:
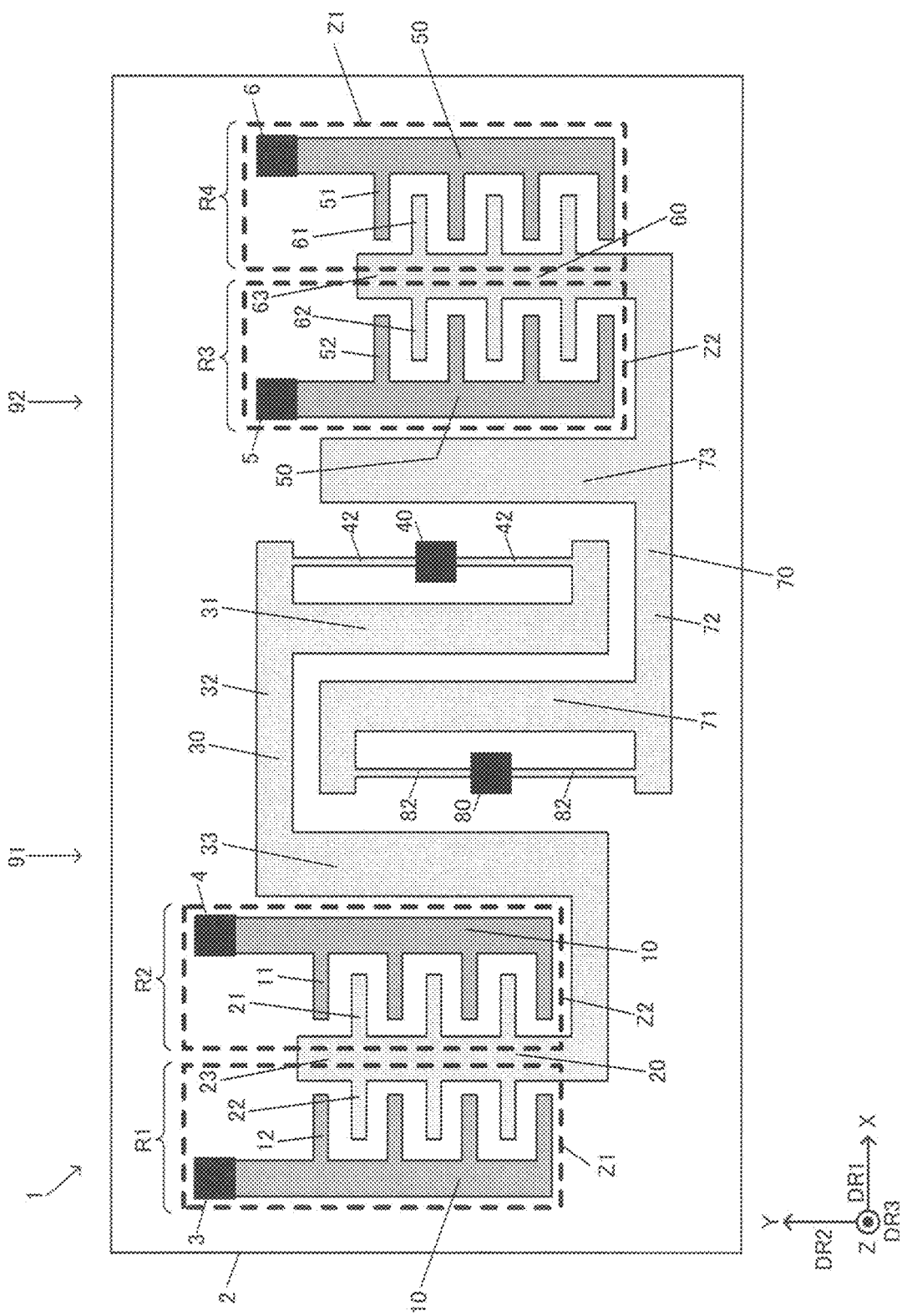
FIG. 8 is a plan view showing another configuration example of the physical quantity sensor.

Another configuration example of the physical quantity sensor 1 is shown in FIG. 8. FIG. 8 is different from FIG. 7 in the positions of the fixed sections 3 and 4 of the first fixed electrode section 10. In FIG. 7, the fixed sections 3 and 4 are disposed on the opposite direction side of the second direction DR2 with respect to the first fixed electrode section 10. In FIG. 8, the fixed sections 3 and 4 are disposed on the second direction DR2 side with respect to the first fixed electrode section 10. Consequently, both of the fixed sections 3 and 4 of the first fixed electrode section 10 and the fixed sections 5 and 6 of the second fixed electrode section 50 are disposed on the second direction DR2 side. Therefore, it is possible to draw out, to the same second direction DR2 side, electrode wires for fixed electrodes extending from the fixed sections 3 and 4 and electrode wires for fixed electrodes extending from the fixed sections 5 and 6. It is possible to efficiently wire the electrode wires.

Figure 9:
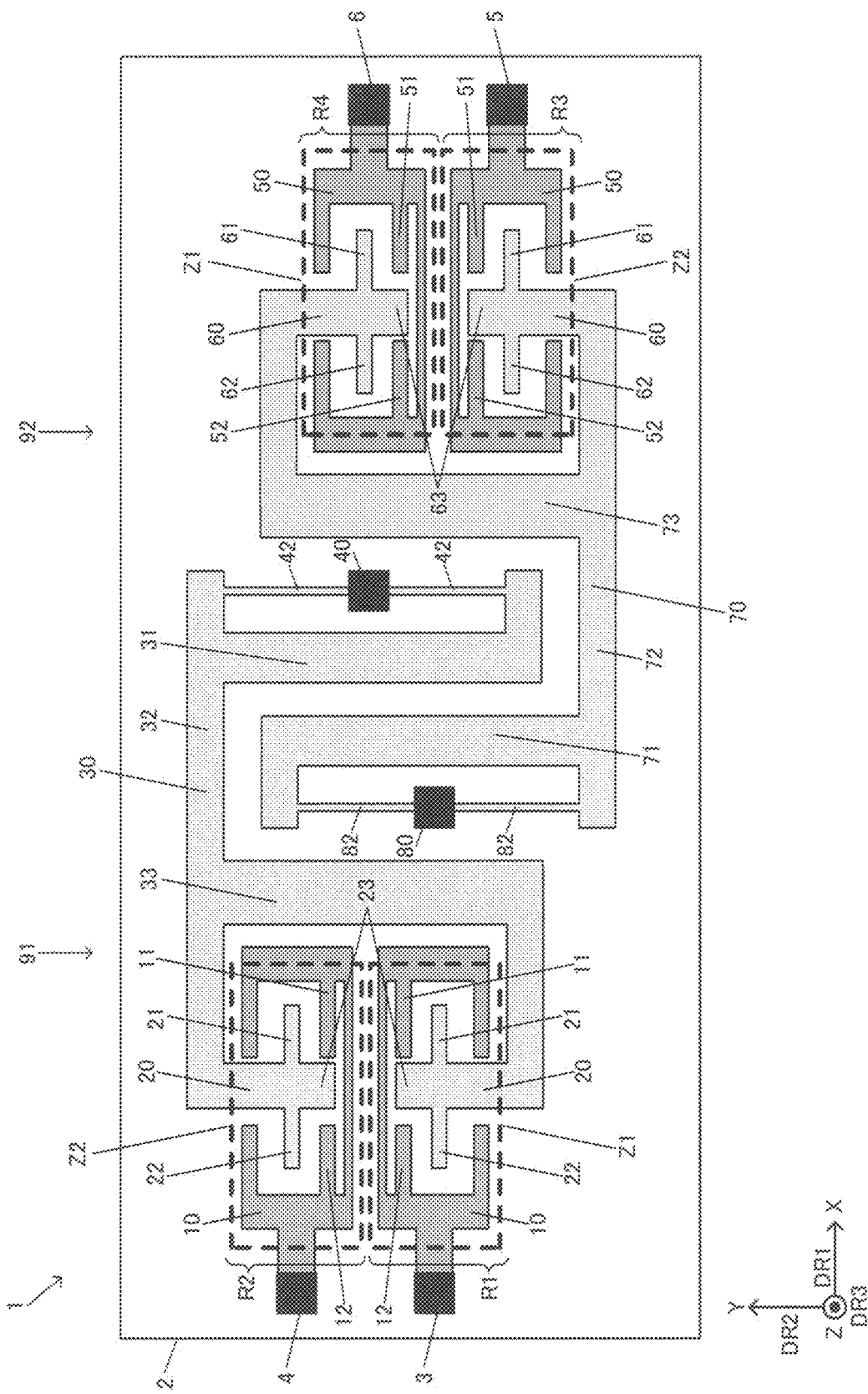
FIG. 9 is a plan view showing another configuration example of the physical quantity sensor.

Another configuration example of the physical quantity sensor 1 is shown in FIG. 9. In FIG. 9, the first region R1 and the second region R2 are regions arranged side by side in the second direction DR2 in the disposition region of the first movable electrode section 20 and the first fixed electrode section 10. The third region R3 and the fourth region R4 are regions arranged side by side in the second direction DR2 in the disposition region of the second movable electrode section 60 and the second fixed electrode section 50. With such disposition, for example, in the detecting sections Z1 and Z2 in the first element section 91 and the second element section 92, changes in the capacitance can be offset. Deterioration in the other axis sensitivity can be suppressed.

In FIGS. 7, 8, and 9, the first movable electrode section 20 includes the first base movable electrode 23, the first movable electrodes 21 extending in the first direction DR1 from the first base movable electrode 23, and the second movable electrodes 22 extending in the opposite direction of the first direction DR1 from the first base movable electrode 23. The first fixed electrode section 10 includes the first fixed electrodes 11 opposed to the first movable electrodes 21 and the second fixed electrodes 12 opposed to the second movable electrodes 22. The second movable electrode section 60 includes the second base movable electrode 63, the third movable electrodes 61 extending in the first direction DR1 from the second base movable electrode 63, and the fourth movable electrodes 62 extending in the opposite direction of the first direction DR1 from the second base movable electrode 63. The second fixed electrode section 50 includes the third fixed electrodes 51 opposed to the third movable electrodes 61 and the fourth fixed electrodes 52 opposed to the fourth movable electrodes 62.

Consequently, when a physical quantity such as acceleration, for example, in the first direction DR1, which is the other axis direction, changes, for example, one opposing area of the opposing area between the first movable electrodes 21 and the first fixed electrodes 11 and the opposing area between the second movable electrodes 22 and the second fixed electrodes 12 decreases and the other opposing area increases. One opposing area of the opposing area between the third movable electrodes 61 and the third fixed electrodes 51 and the opposing area between the fourth movable electrodes 62 and the fourth fixed electrodes 52 decreases and the other opposing area increases. Therefore, changes in the opposing areas can be offset when the physical quantity such as acceleration in the other axis direction changes. Deterioration in the other axis sensitivity can be suppressed.

In FIGS. 7, 8, and 9, as in FIG. 6, electrode disposition may be adopted in which the fixed electrodes are extended to both sides from the base fixed electrode to be opposed to the movable electrodes corresponding to the fixed electrodes.

3. Inertial Measurement Device

Figure 10:
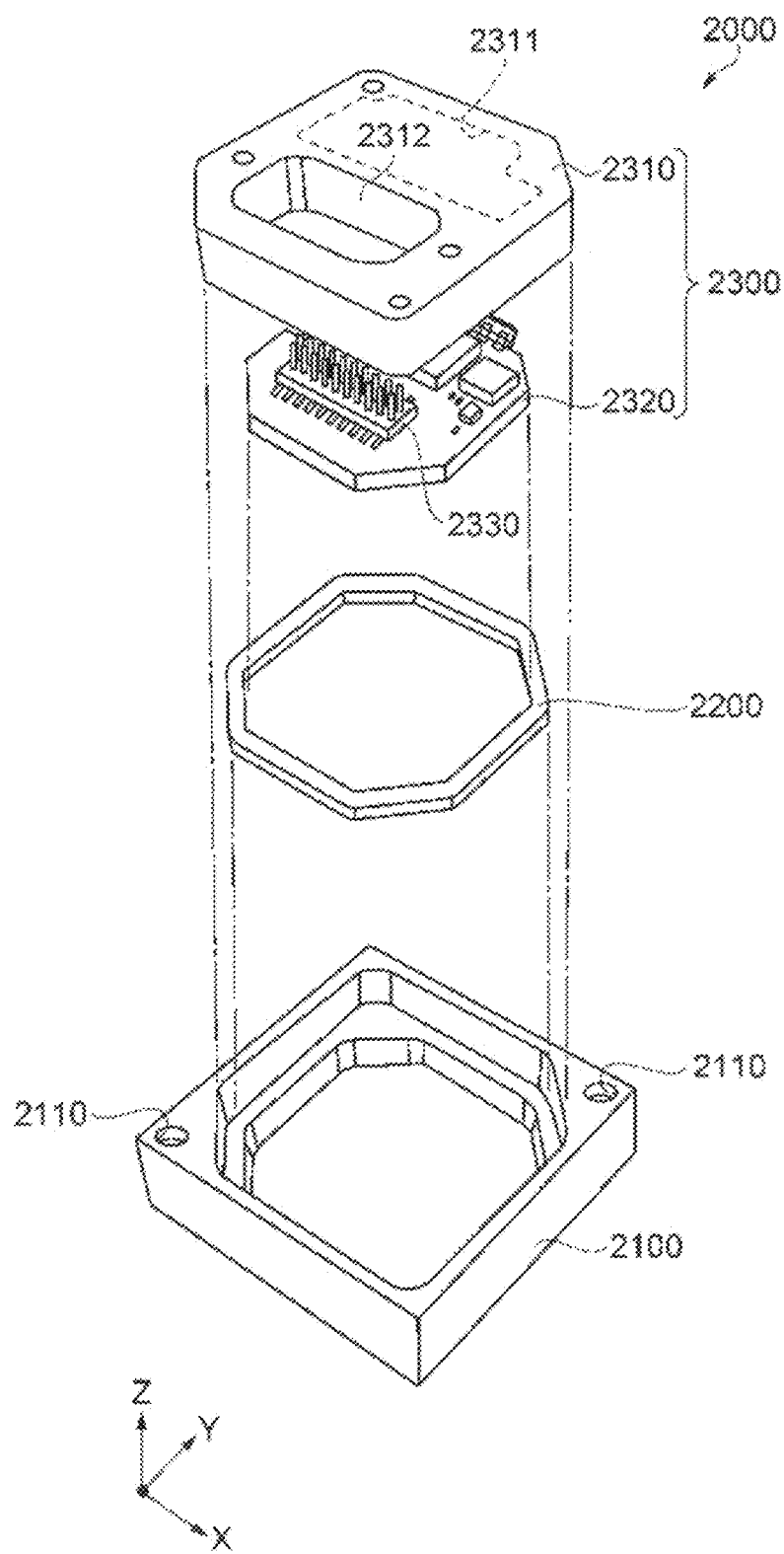
FIG. 10 is an exploded perspective view showing a schematic configuration of an inertial measurement device including the physical quantity sensor.

Subsequently, an example of an inertial measurement device 2000 in this embodiment is explained with reference to FIGS. 10 and 11. The inertial measurement device 2000 (IMU: Inertial Measurement Unit) shown in FIG. 10 is a device that detects inertial momentum such as a posture or a behavior of a moving body such as an automobile or a robot. The inertial measurement device 2000 is a so-called six-axis motion sensor including an acceleration sensor that detects accelerations ax, ay, and az in directions extending along three axes and an angular velocity sensor that detects angular velocities ωx, ωy, and ωz around the three axes.

The inertial measurement device 2000 is a rectangular parallelepiped, a plane shape of which is a substantial square. Screw holes 2110 functioning as mount sections are formed near vertexes in two places located in a diagonal direction of the square. The inertial measurement device 2000 can be fixed to a mount surface of a mount body such as an automobile by inserting two screws through the screw holes 2210 in the two places. The inertial measurement device 2000 can also be reduced to a size mountable on a smartphone or a digital camera through selection of components and a design change.

The inertial measurement device 2000 includes an outer case 2100, a joining member 2200 and a sensor module 2300. The sensor module 2300 is inserted into the inside of the outer case 2100 with the joining member 2200 interposed. The sensor module 2300 includes an inner case 2310 and a circuit board 2320. A recess 2311 for preventing contact with the circuit board 2320 and an opening 2312 for exposing a connector 2330 explained below are formed in the inner case 2310. The circuit board 2320 is joined to the lower surface of the inner case 2310 via an adhesive.

Figure 11:
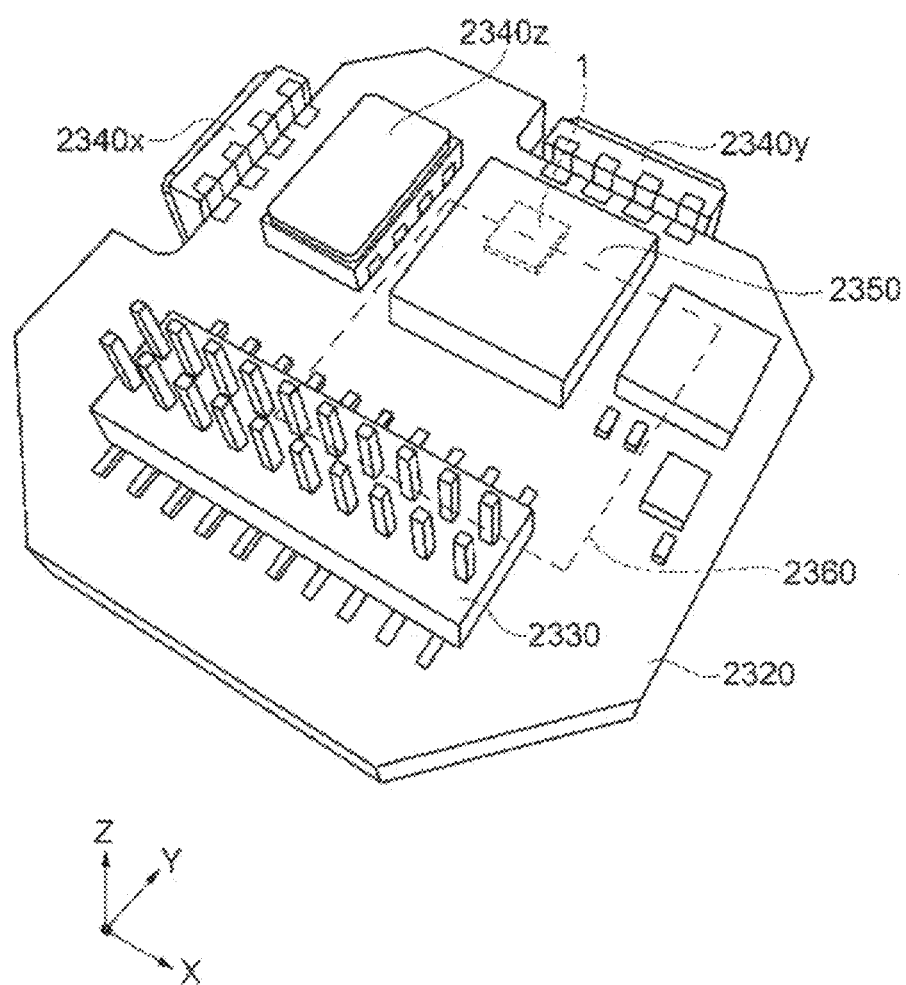
FIG. 11 is a perspective view of a circuit board of the physical quantity sensor.

As shown in FIG. 11, a connector 2330, an angular velocity sensor 2340z that detects angular velocity around the Z axis, an acceleration sensor unit 2350 that detects accelerations in axial directions of the X axis, the Y axis, and the Z axis, and the like are mounted on the upper surface of the circuit board 2320. An angular velocity sensor 2340x that detects angular velocity around the X axis and an angular velocity sensor 2340y that detects angular velocity around the Y axis are mounted on a side surface of the circuit board 2320.

The acceleration sensor unit 2350 includes at least the physical quantity sensor 1 for measuring acceleration in the Z-axis direction explained above and can detect acceleration in one axial direction or detect accelerations in two axial directions or three axial directions according to necessity. The angular velocity sensors 2340x, 2340y, and 2340z are not particularly limited. For example, a vibration gyro sensor that makes use of the Coriolis force can be used as the angular velocity sensors 2340x, 2340y, and 2340z.

A control IC 2360 is mounted on the lower surface of the circuit board 2320. The control IC 2360 functioning as a control section that performs control based on a detection signal output from the physical quantity sensor 1 is, for example, an MCU (Micro Controller Unit). The control IC 2360 incorporates a storing section including a nonvolatile memory, an A/D converter, and the like and controls the sections of the inertial measurement device 2000. Besides, a plurality of electronic components are mounted on the circuit board 2320.

As explained above, the inertial measurement device 2000 in this embodiment includes the physical quantity sensor 1 and the control IC 2360 functioning as the control section that performs control based on a detection signal output from the physical quantity sensor 1. With the inertial measurement device 2000, since the acceleration sensor unit 2350 including the physical quantity sensor 1 is used, it is possible to provide the inertial measurement device 2000 that can enjoy the effects of the physical quantity sensor 1 and realize improvement of accuracy and the like.

The inertial measurement device 2000 is not limited to the configuration shown in FIGS. 10 and 11. For example, in the inertial measurement device 2000, a configuration may be adopted in which the angular velocity sensors 2340x, 2340y, and 2340z are not provided and only the physical quantity sensor 1 is provided as an inertial sensor. In this case, for example, the inertial measurement device 2000 only has to be realized by housing the physical quantity sensor 1 and the control IC 2360, which realizes the control section, in a package, which is a housing container.

As explained above, a physical quantity sensor in an embodiment includes: a first fixed electrode section and a second fixed electrode section provided on a substrate; a first movable electrode section provided such that a movable electrode is opposed to a fixed electrode of the first fixed electrode section; and a second movable electrode section provided such that a movable electrode is opposed to a fixed electrode of the second fixed electrode section. The physical quantity sensor includes: a first fixed section and a second fixed section fixed to the substrate; a first support beam, one end of which is coupled to the first fixed section; a first coupling section configured to couple another end of the first support beam and the first movable electrode section; a second support beam, one end of which is coupled to the second fixed section; and a second coupling section configured to couple another end of the second support beam and the second movable electrode section. When three directions orthogonal to one another are represented as a first direction, a second direction, and a third direction, in a plane view in the third direction orthogonal to the substrate, the first movable electrode section, the second fixed section, the first fixed section, and the second movable electrode section are disposed side by side in the first direction in order of the first movable electrode section, the second fixed section, the first fixed section, and the second movable electrode section.

With the physical quantity sensor having such a configuration, the second fixed section can be disposed using a space between the first fixed section and the first movable electrode section. The first fixed section can be disposed using a space between the second fixed section and the second movable electrode section. Therefore, the first movable electrode section, the second fixed section, the first fixed section, and the second movable electrode section can be compactly disposed side by side in the first direction. A reduction in the size of the physical quantity sensor can be realized. The first fixed section and the second fixed section can be disposed close to each other. Deterioration in accuracy due to the influence of a warp of the substrate or the like of the physical quantity sensor can be minimized. Both of the reduction in the size and improvement of accuracy of the physical quantity sensor can be realized.

In the embodiment, the movable electrode of the first movable electrode section and the fixed electrode of the first fixed electrode section may be opposed in the second direction, and the movable electrode of the second movable electrode section and the fixed electrode of the second fixed electrode section may be opposed in the second direction.

Consequently, for example, it is possible to detect a change in capacitance due to a change in an opposing area between the first movable electrode section and the first fixed electrode section and a change in capacitance due to a change in an opposing area between the second movable electrode section and the second fixed electrode section and measure a physical quantity.

In the embodiment, the first movable electrode section may include a first base movable electrode, a first movable electrode extending in the first direction from the first base movable electrode, and a second movable electrode extending in an opposite direction of the first direction from the first base movable electrode, and the first fixed electrode section may include a first fixed electrode opposed to the first movable electrode and a second fixed electrode opposed to the second movable electrode.

Consequently, when a physical quantity changes in the other axis direction, for example, one opposing area of an opposing area between the first movable electrode and the first fixed electrode and an opposing area between the second movable electrode and the second fixed electrode decreases and the other opposing area increases. For example, deterioration in other axis sensitivity can be suppressed.

In this embodiment, the second movable electrode section may include a second base movable electrode, a third movable electrode extending in the first direction from the second base movable electrode, and a fourth movable electrode extending in an opposite direction of the first direction from the second base movable electrode, and the second fixed electrode section may include a third fixed electrode opposed to the third movable electrode and a fourth fixed electrode opposed to the fourth movable electrode.

Consequently, when a physical quantity changes in the other axis direction, for example, one opposing area of an opposing area between the third movable electrode and the third fixed electrode and an opposing area between the fourth movable electrode and the fourth fixed electrode decreases and the other opposing area increases. For example, deterioration in other axis sensitivity can be suppressed.

In this embodiment, the first fixed electrode section may include a first base fixed electrode, a first fixed electrode extending in the first direction from the first base fixed electrode, and a second fixed electrode extending in an opposite direction of the first direction from the first base fixed electrode, and the first movable electrode section may include a first movable electrode opposed to the first fixed electrode and a second movable electrode opposed to the second fixed electrode.

Consequently, when a physical quantity changes in the other axis direction, for example, one opposing area of an opposing area between the first movable electrode and the first fixed electrode and an opposing area between the second movable electrode and the second fixed electrode decreases and the other opposing area increases. For example, deterioration in other axis sensitivity can be suppressed.

In this embodiment, the second fixed electrode section may include a second base fixed electrode, a third fixed electrode extending in the first direction from the second base fixed electrode, and a fourth fixed electrode extending in an opposite direction of the first direction from the second base fixed electrode, and the second movable electrode section may include a third movable electrode opposed to the third fixed electrode and a fourth movable electrode opposed to the fourth fixed electrode.

Consequently, when a physical quantity changes in the other axis direction, for example, one opposing area of an opposing area between the third movable electrode and the third fixed electrode and an opposing area between the fourth movable electrode and the fourth fixed electrode decreases and the other opposing area increases. For example, deterioration in other axis sensitivity can be suppressed.

In this embodiment, when the first movable electrode section and the second movable electrode section are displaced in the third direction, capacitance between the first movable electrode section and the first fixed electrode section may decrease and, when the first movable electrode section and the second movable electrode section are displaced in a fourth direction, which is an opposite direction of the third direction, capacitance between the second movable electrode section and the second fixed electrode section may decrease.

Consequently, by detecting, for example, a decrease in the capacitance between the first movable electrode section and the first fixed electrode section, it is possible to detect that the first movable electrode section and the second movable electrode section are displaced in the third direction. By detecting, for example, a decrease in the capacitance between the second movable electrode section and the second fixed electrode section, it is possible to detect that the first movable electrode section and the second movable electrode section are displaced in the fourth direction.

In this embodiment, when the first movable electrode section and the second movable electrode section are displaced in the third direction, capacitance between the first movable electrode section and the first fixed electrode section disposed in a first region in a disposition region of the first movable electrode section and the first fixed electrode section may decrease and capacitance between the second movable electrode section and the second fixed electrode section disposed in a fourth region in a disposition region of the second movable electrode section and the second fixed electrode section may decrease. When the first movable electrode section and the second movable electrode section are displaced in a fourth direction, which is an opposite direction of the third direction, capacitance between the first movable electrode section and the first fixed electrode section disposed in a second region in the disposition region of the first movable electrode section and the first fixed electrode section may decrease and capacitance between the second movable electrode section and the second fixed electrode section disposed in a third region in the disposition region of the second movable electrode section and the second fixed electrode section may decrease.

Consequently, by detecting, for example, a decrease in the capacitance between the first movable electrode section and the first fixed electrode section in the first region or a decrease in the capacitance between the second movable electrode section and the second fixed electrode section in the fourth region, it is possible to detect that the first movable electrode section and the second movable electrode section are displaced in the third direction. By detecting, for example, a decrease in the capacitance between the first movable electrode section and the first fixed electrode section in the second region or a decrease in the capacitance between the second movable electrode section and the second fixed electrode section in the third region, it is possible to detect that the first movable electrode section and the second movable electrode section are displaced in the fourth direction.

In this embodiment, the first region and the second region may be regions arranged side by side in the first direction in the disposition region of the first movable electrode section and the first fixed electrode section, and the third region and the fourth region may be regions arranged side by side in the first direction in the disposition region of the second movable electrode section and the second fixed electrode section.

Consequently, for example, when the first movable electrode section and the second movable electrode section move in the other axis direction, the capacitance in the first region decreases and, on the other hand, the capacitance in the second region increases. Therefore, changes in the capacitance are offset and, for example, deterioration in the other axis sensitivity can be suppressed. The capacitance in the third region decreases and, on the other hand, the capacitance in the fourth region increases. Therefore, changes in the capacitance are offset and, for example, deterioration in the other axis sensitivity can be suppressed.

In this embodiment, the first region and the second region may be regions arranged side by side in the second direction in the disposition region of the first movable electrode section and the first fixed electrode section, and the third region and the fourth region may be regions arranged side by side in the second direction in the disposition region of the second movable electrode section and the second fixed electrode section.

With such disposition as well, changes in the capacitance can be offset and, for example, deterioration in the other axis sensitivity can be suppressed, for example, in detecting sections in element sections.

In this embodiment, the first movable electrode section may include a first base movable electrode, a first movable electrode extending in the first direction from the first base movable electrode, and a second movable electrode extending in an opposite direction of the first direction from the first base movable electrode, and the first fixed electrode section may include a first fixed electrode opposed to the first movable electrode and a second fixed electrode opposed to the second movable electrode. The second movable electrode section may include a second base movable electrode, a third movable electrode extending in the first direction from the second base movable electrode, and a fourth movable electrode extending in the opposite direction of the first direction from the second base movable electrode, and the second fixed electrode section may include a third fixed electrode opposed to the third movable electrode and a fourth fixed electrode opposed to the fourth movable electrode.

Consequently, when a physical quantity in the other axis direction changes, for example, one opposing area of an opposing area between the first movable electrode and the first fixed electrode and an opposing area between the second movable electrode and the second fixed electrode decreases and the other opposing area increases. One opposing area of an opposing area between the third movable electrode and the third fixed electrode and an opposing area of the fourth movable electrode and the fourth fixed electrode decreases and the other opposing area increases. For example, deterioration in the other axis sensitivity can be suppressed.

In this embodiment, in the plane view, the first movable electrode section, the second fixed section and the second support beam, the first fixed section and the first support beam, and the second movable electrode section may be disposed side by side in the first direction in order of the first movable electrode section, the second fixed section and the second support beam, the first fixed section and the first support beam, and the second movable electrode section.

Consequently, the second fixed section and the second support beam can be disposed using a space between the first fixed section and the first support beam and the first movable electrode section. The first fixed section and the first support beam can be disposed using a space between the second fixed section and the second support beam and the second movable electrode section. For example, a reduction in the size of the physical quantity sensor can be realized.

This embodiment relates to an inertial measurement device including: the physical quantity sensor described above; and a control section configured to perform control based on a detection signal output from the physical quantity sensor.

As explained above, this embodiment is explained in detail. However, it would be easily understood by those skilled in the art that many modifications not substantially departing from the new matters and the effects of the present disclosure are possible. Therefore, all of such modifications are deemed to be included in the scope of the present disclosure. For example, terms described together with broader-sense or synonymous different terms at least once in the specification or the drawings can be replaced with the different terms in any place of the specification or the drawings. All combinations of this embodiment and the modifications are included in the scope of the present disclosure. The configurations, the operations, and the like of the physical quantity sensor and the inertial measurement device are not limited to the configurations, the operations, and the like explained in this embodiment. Various modified implementations are possible.

What is claimed is:
1. A physical quantity sensor comprising:
a substrate that is plate-shaped, the substrate having four sides along either a first direction or a second direction, the first and second directions being two of three directions orthogonal to one another represented as the first direction, the second direction, and a third direction;

a first pair of fixed electrode sections and a second pair of fixed electrode sections provided on the substrate, each of the first and second pairs of fixed electrode sections extending along the second direction;

a first pair of electrode fixes sections and a second pair of electrode fixed sections fixing the first and second pairs of fixed electrode sections to the substrate at ends of the first and second pairs of fixed electrode sections, respectively;

a first movable monolithic body including a first movable electrode section, a first support beam, a first extending section, and a first coupling section, each of the first movable electrode section and the first support beam extending along the second direction; and a second movable monolithic body including a second movable electrode section, a second support beam, a second extending section, and a second coupling section, each of the second movable electrode section and the second support beam extending along the second direction, wherein the first and second pairs of fixed electrode sections and the first and second movable monolithic bodies are laterally spaced apart from one another in a plan view when viewed along the third direction orthogonal to the substrate, a movable electrode of the first movable electrode section is laterally overlapped with a fixed electrode of each of the first pair of fixed electrode sections on a first plane extending along the first direction and the second direction, a movable electrode of the second movable electrode section is laterally overlapped with a fixed electrode of each of the second pair of fixed electrode sections on the first plane, first and second fixed sections fix the first and second movable monolithic bodies to the substrate, respectively, one end of the first support beam is coupled to the first fixed section, the first coupling section is configured to couple another end of the first support beam and the first movable electrode section, the first extending section extends from at an intermediate point of the first coupling section along the second direction, and the first extending section is located directly adjacent to one of the first pair of fixed electrode sections, one end of the second support beam is coupled to the second fixed section, the second coupling section is configured to couple another end of the second support beam and the second movable electrode section, the second extending section extends from at an intermediate point of the second coupling section along the second direction, and the second extending section is located directly adjacent to one of the second pair of fixed electrode sections, in the plane view in the third direction, the first movable electrode section, the second fixed section, the first fixed section, and the second movable electrode section are disposed side by side in the first direction in order of the first movable electrode section, the second fixed section, the first fixed section, and the second movable electrode section, wherein the first pair of fixed electrode sections includes a first fixed electrode section, and the second pair of fixed electrode sections includes a second fixed electrode section, the substrate has a center line passing through a center thereof and extending along the first direction, the first and second fixed sections are laterally spaced apart from the center line in opposite directions along the second direction toward different sides of the substrate, and the first and second pairs of electrode fixed sections are located closer to at least two sides of the four sides of the substrate than the first and second fixed sections, respectively.

2. The physical quantity sensor according to claim 1, wherein the first movable electrode section includes a first base movable electrode, a first movable electrode extending in the first direction from the first base movable electrode, and a second movable electrode extending in an opposite direction of the first direction from the first base movable electrode, and the first pair of fixed electrode sections includes a first fixed electrode opposed to the first movable electrode and a second fixed electrode opposed to the second movable electrode.

3. The physical quantity sensor according to claim 2, wherein the second movable electrode section includes a second base movable electrode, a third movable electrode extending in the first direction from the second base movable electrode, and a fourth movable electrode extending in an opposite direction of the first direction from the second base movable electrode, and the second pair of fixed electrode sections includes a third fixed electrode opposed to the third movable electrode and a fourth fixed electrode opposed to the fourth movable electrode.

4. The physical quantity sensor according to claim 1, wherein the first pair of fixed electrode sections includes a first base fixed electrode, a first fixed electrode extending in the first direction from the first base fixed electrode, and a second fixed electrode extending in an opposite direction of the first direction from the first base fixed electrode, and the first movable electrode section includes a first movable electrode opposed to the first fixed electrode and a second movable electrode opposed to the second fixed electrode.

5. The physical quantity sensor according to claim 4, wherein the second pair of fixed electrode sections includes a second base fixed electrode, a third fixed electrode extending in the first direction from the second base fixed electrode, and a fourth fixed electrode extending in an opposite direction of the first direction from the second base fixed electrode, and the second movable electrode section includes a third movable electrode opposed to the third fixed electrode and a fourth movable electrode opposed to the fourth fixed electrode.

6. The physical quantity sensor according to claim 1, wherein when the first movable electrode section and the second movable electrode section are displaced in the third direction, capacitance between the first movable electrode section and the first pair of fixed electrode sections decreases, and when the first movable electrode section and the second movable electrode section are displaced in a fourth direction, which is an opposite direction of the third direction, capacitance between the second movable electrode section and the second pair of fixed electrode sections decreases.

7. The physical quantity sensor according to claim 1, wherein when the first movable electrode section and the second movable electrode section are displaced in the third direction, capacitance between the first movable electrode section and the first fixed electrode section disposed in a first region in a disposition region of the first movable electrode section and the first fixed electrode section decreases and capacitance between the second movable electrode section and the second fixed electrode section disposed in a fourth region in a disposition region of the second movable electrode section and the second fixed electrode section decreases, and when the first movable electrode section and the second movable electrode section are displaced in a fourth direction, which is an opposite direction of the third direction, capacitance between the first movable electrode section and the first fixed electrode section disposed in a second region in the disposition region of the first movable electrode section and the first fixed electrode section decreases and capacitance between the second movable electrode section and the second fixed electrode section disposed in a third region in the disposition region of the second movable electrode section and the second fixed electrode section decreases.

8. The physical quantity sensor according to claim 7, wherein the first region and the second region are regions arranged side by side in the first direction in the disposition region of the first movable electrode section and the first fixed electrode section, and the third region and the fourth region are regions arranged side by side in the first direction in the disposition region of the second movable electrode section and the second fixed electrode section.

9. The physical quantity sensor according to claim 7, wherein the first region and the second region are regions arranged side by side in the second direction in the disposition region of the first movable electrode section and the first fixed electrode section, and the third region and the fourth region are regions arranged side by side in the second direction in the disposition region of the second movable electrode section and the second fixed electrode section.

10. The physical quantity sensor according to claim 7, wherein the first movable electrode section includes a first base movable electrode, a first movable electrode extending in the first direction from the first base movable electrode, and a second movable electrode extending in an opposite direction of the first direction from the first base movable electrode, the first fixed electrode section includes a first fixed electrode opposed to the first movable electrode and a second fixed electrode opposed to the second movable electrode, the second movable electrode section includes a second base movable electrode, a third movable electrode extending in the first direction from the second base movable electrode, and a fourth movable electrode extending in the opposite direction of the first direction from the second base movable electrode, and the second fixed electrode section includes a third fixed electrode opposed to the third movable electrode and a fourth fixed electrode opposed to the fourth movable electrode.

11. The physical quantity sensor according to claim 1, wherein, in the plane view, the first movable electrode section, the second fixed section and the second support beam, the first fixed section and the first support beam, and the second movable electrode section are disposed side by side in the first direction in order of the first movable electrode section, the second fixed section and the second support beam, the first fixed section and the first support beam, and the second movable electrode section.

12. An inertial measurement device comprising:
the physical quantity sensor according to claim 1; and
a control section configured to perform control based on a detection signal output from the physical quantity sensor.

* * * * *